United States Patent
Uehira et al.

(10) Patent No.: US 9,321,882 B2
(45) Date of Patent: *Apr. 26, 2016

(54) POLYESTER POLYMER, RESIN COMPOSITION, MOLDED PRODUCT, AND FILM

(71) Applicant: FUJIFILM Corporation, Tokyo (JP)

(72) Inventors: Shigeki Uehira, Kanagawa (JP); Toshimitsu Sakuma, Kanagawa (JP); Toshihide Yoshitani, Kanagawa (JP); Kozo Sato, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 404 days.

This patent is subject to a terminal disclaimer.

(21) Appl. No.: 13/921,745

(22) Filed: Jun. 19, 2013

(65) Prior Publication Data

US 2013/0281619 A1    Oct. 24, 2013

Related U.S. Application Data

(63) Continuation of application No. PCT/JP2011/079695, filed on Dec. 21, 2011.

(30) Foreign Application Priority Data

Dec. 24, 2010 (JP) .................................. 2010-288947
May 19, 2011 (JP) .................................. 2011-112702
Jul. 26, 2011 (JP) .................................. 2011-163312

(51) Int. Cl.
*C08G 63/199* (2006.01)
*C08G 63/181* (2006.01)

(52) U.S. Cl.
CPC ............ *C08G 63/199* (2013.01); *C08G 63/181* (2013.01)

(58) Field of Classification Search
CPC ...... C08L 67/02; C08G 63/64; C08G 63/199; C08G 63/181
See application file for complete search history.

(56) References Cited

U.S. PATENT DOCUMENTS 3,215,656 A * 11/1965 Raichle et al. ..................... 525/8
3,835,182 A *  9/1974 Schuller ............................. 560/7

(Continued)

FOREIGN PATENT DOCUMENTS

JP      06-33395     2/1994
JP      2008-274150  11/2008

(Continued)

OTHER PUBLICATIONS

Chinese Official Action—201180061478.X—Apr. 30, 2014.

(Continued)

*Primary Examiner* — Michael A Salvitti
(74) *Attorney, Agent, or Firm* — Young & Thompson

(57) ABSTRACT

Provided is a polyester polymer including a repeating unit derived from a dicarboxylic acid compound containing a partial structure represented by the following Formula (C) and a repeating unit derived from a diol compound containing a cyclic structure, in which the partial structure represented by Formula (C) constitutes a portion of the main chain:

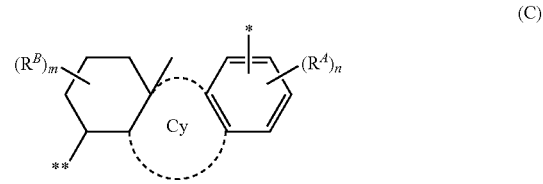

(C)

wherein in Formula (C), $R^A$ and $R^B$ each independently represent a hydrogen atom or an alkyl group having 1 to 6 carbon atoms; n and m each independently represent an integer from 0 to 2; Cy represents an unsaturated 6-membered or 7-membered ring which may contain a heteroatom; and * and ** each represent a bonding hand, while * may be a bonding hand extending from $R^A$.

10 Claims, 2 Drawing Sheets

(56) References Cited

U.S. PATENT DOCUMENTS

| | | | |
|---|---|---|---|
| 4,968,575 A * | 11/1990 | Matsumura et al. | 430/109.4 |
| 4,981,939 A * | 1/1991 | Matsumura et al. | 527/604 |
| 5,399,660 A | 3/1995 | Uchida et al. | |
| 5,554,716 A * | 9/1996 | Kohler et al. | 528/196 |
| 8,658,757 B2 * | 2/2014 | Uehira et al. | 528/348 |
| 8,748,561 B2 * | 6/2014 | Sato et al. | 528/298 |
| 2001/0021737 A1 * | 9/2001 | Hazen et al. | 524/300 |
| 2008/0096118 A1 * | 4/2008 | Mera et al. | 430/109.4 |
| 2009/0156784 A1 * | 6/2009 | Kubo et al. | 530/211 |
| 2010/0136471 A1 * | 6/2010 | Yamada et al. | 430/108.4 |
| 2012/0101250 A1 * | 4/2012 | Sakuma et al. | 528/298 |
| 2012/0183896 A1 * | 7/2012 | Sacripante et al. | 430/108.4 |
| 2012/0183897 A1 * | 7/2012 | Farrugia et al. | 430/109.4 |
| 2012/0302672 A1 * | 11/2012 | Delfosse et al. | 524/59 |
| 2012/0322969 A1 | 12/2012 | Sato et al. | |
| 2013/0022907 A1 * | 1/2013 | Fukagawa et al. | 430/114 |
| 2013/0164668 A1 * | 6/2013 | Sacripante et al. | 430/108.1 |
| 2013/0196262 A1 * | 8/2013 | Farrugia et al. | 430/109.4 |
| 2013/0281619 A1 * | 10/2013 | Uehira et al. | 524/604 |
| 2014/0170545 A1 * | 6/2014 | Farrugia et al. | 430/105 |
| 2015/0111147 A1 * | 4/2015 | Sacripante et al. | 430/109.4 |
| 2015/0197668 A1 * | 7/2015 | Sacripants et al. | 430/109.4 |

FOREIGN PATENT DOCUMENTS

| | | |
|---|---|---|
| WO | 2010-150847 | 12/2010 |
| WO | 2011-096145 | 8/2011 |
| WO | 2011-125795 | 10/2011 |

OTHER PUBLICATIONS

Written Opinion of the ISA issued in International Application No. PCT/JP2011/079695 on Feb. 7, 2012.

International Search Report PCT/JP2011/079695 dated Feb. 7, 2012, with English translation.

* cited by examiner

POLYESTER POLYMER, RESIN COMPOSITION, MOLDED PRODUCT, AND FILM

CROSS-REFERENCE TO RELATED APPLICATIONS

This application is a continuation application of International Application No. PCT/JP/2011/079695, filed Dec. 21, 2011, the disclosure of which is incorporated herein by reference in its entirety. Further, this application claims priority from Japanese Patent Application Nos. 2010-288947, 2011-112702, and 2011-163312, the disclosures of which are incorporated herein by reference in their entirety.

TECHNICAL FIELD

The present invention relates to a polyester polymer, a resin composition, a molded product, and a film.

In recent years, reduction of dependence on petroleum in relation to resources has been examined from the viewpoint of global environment protection, and attention has been paid to various natural resources. Reduction of dependence on petroleum is attempted in the field of plastics, and polylactic acid using lactic acid, which is obtained by fermentation of glucose, as a raw material is widely used in packaging materials and the like.

Polylactic acid has excellent transparency, but since the material has low heat resistance, application thereof to molded articles through injection molding or the like is confined to limited applications where there is no exposure to high temperatures.

As a component originating from a natural product (preferably, a plant), rosin that can be collected from pine resin and the like is available. The rosin is composed of various carboxylic acids, and it is known that abietic acid, among carboxylic acids, is used for polymer materials. For example, it is disclosed that abietic acid is used to modify the chain ends of a phenolic resin or an epoxy resin, thereby obtaining a rosin-modified phenolic resin and a rosin-modified epoxy acid resin, which are used as binders for coating materials and the like (see, for example, JP-A No. 2008-274150).

Furthermore, polymers obtained by polymerizing abietic acid with polyhydric alcohols are also known (see, for example, JP-A No. 6-33395).

SUMMARY OF INVENTION

Technical Problem

However, since the resins described in JP-A No. 2008-274150 have a phenolic resin or an epoxy resin as the main skeletal structure, these resins are petroleum-dependent raw materials and are still unsatisfactory from the viewpoint of global environment protection. Furthermore, the polymers described in JP-A No. 6-33395 irregularly polymerize and undergo gelation, so that linear polymers having high molecular weights are not obtained. Therefore, it has been difficult to utilize such a polymer for industrial applications such as molded products.

In view of the problems described above, a problem to be solved by the present invention is to provide a polyester polymer which has a main skeletal structure derived from a compound originating from plants and exhibits excellent heat resistance. Another problem to be solved by the present invention is to provide a resin composition containing the polyester polymer, a molded product, and a film.

Means for Solving the Problems

Specific means for solving the problems described above are as follows.

<1> A polyester polymer including a repeating unit derived from a dicarboxylic acid compound containing a partial structure represented by the following Formula (C) and a repeating unit derived from a diol compound containing a cyclic structure, in which the partial structure represented by the above-described Formula (C) constitutes a portion of a main chain.

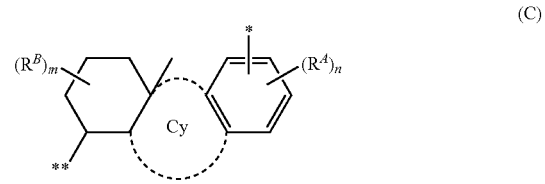

(C)

wherein, in Formula (C), $R^A$ and $R^B$ each independently represent a hydrogen atom or an alkyl group having 1 to 6 carbon atoms; n and m each independently represent an integer from 0 to 2; Cy represents an unsaturated 6-membered or 7-membered ring which may contain a heteroatom; and * and ** each represent a bonding hand, and * may be a bonding hand extending from $R^A$.

<2> The polyester polymer described in <1>, wherein the repeating unit derived from a dicarboxylic acid compound is at least one selected from the group consisting of a repeating unit represented by the following Formula (A10) and a repeating unit represented by the following Formula (A20):

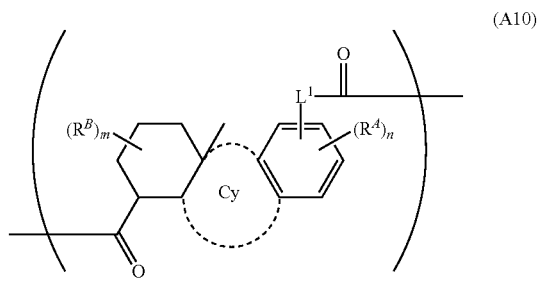

(A10)

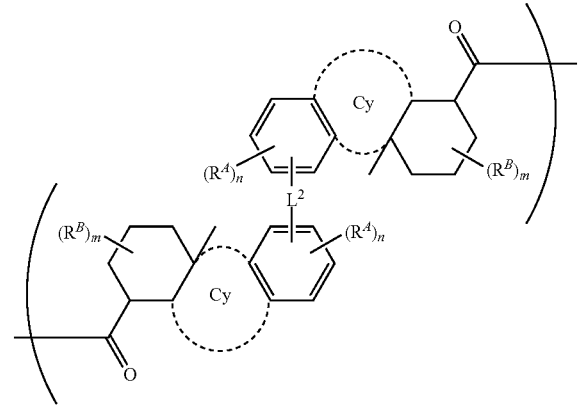

(A20)

wherein, in Formulae (A10) and (A20), $L^1$ represents a single bond or a divalent linking group composed of at least one selected from the group consisting of an alkylene group, an alkenylene group, an arylene group, an oxygen atom and a carbonyl group; $L^2$ represents a single bond or a divalent linking group composed of at least one selected from the group consisting of an oxygen atom, a sulfur atom, a carbonyl group, a sulfonyl group, an alkylene group, an alkenylene group and an arylene group; $R^A$ and $R^B$ each independently represent a hydrogen atom or an alkyl group having 1 to 6 carbon atoms; n and m each independently represent an integer from 0 to 2; and Cy represents an unsaturated 6-membered or 7-membered ring which may contain a heteroatom.

<3> The polyester polymer described in <1> or <2>, wherein the repeating unit derived from a dicarboxylic acid compound is at least one selected from the group consisting of a repeating unit represented by the following Formula (A1) and a repeating unit represented by the following Formula (A2):

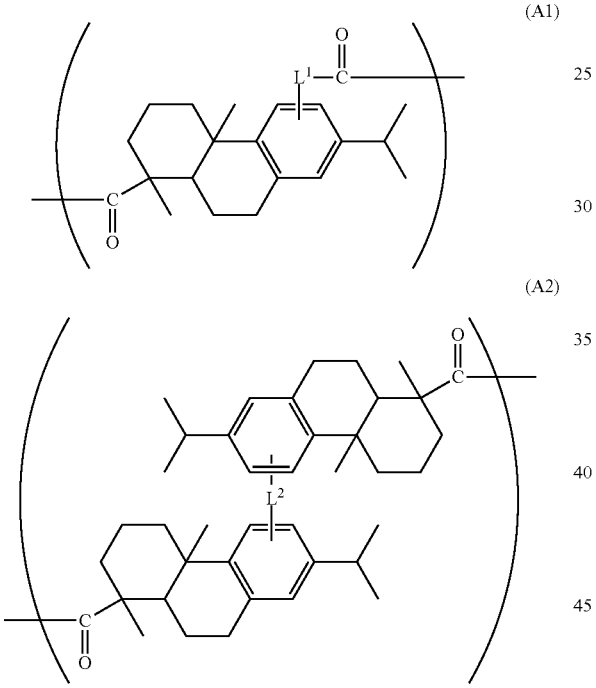

wherein, in Formulae (A1) and (A2), $L^1$ represents a single bond or a divalent linking group composed of at least one selected from the group consisting of an alkylene group, an alkenylene group, an arylene group, an oxygen atom and a carbonyl group; and $L^2$ represents a single bond or a divalent linking group composed of at least one selected from the group consisting of an oxygen atom, a sulfur atom, a carbonyl group, a sulfonyl group, an alkylene group, an alkenylene group and an arylene group.

<4> The polyester polymer described in <2> or <3>, wherein $L^1$ represents a single bond or at least one selected from the group consisting of linking groups represented by the following Formulae: (L1-ex-1) to (L1-ex-17):

*—CH$_2$—** (L1-ex-1)

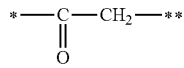 (L1-ex-2)

*—C$_2$H$_4$—** (L1-ex-3)

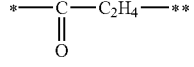 (L1-ex-4)

*—C$_3$H$_6$—** (L1-ex-5)

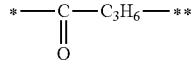 (L1-ex-6)

*—C$_4$H$_8$—** (L1-ex-7)

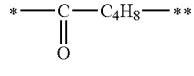 (L1-ex-8)

*—(CH$_2$)$_{10}$—** (L1-ex-9)

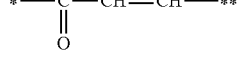 (L1-ex-10)

 (L1-ex-11)

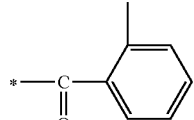 (L1-ex-12)

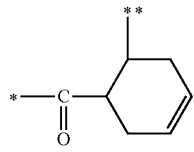 (L1-ex-13)

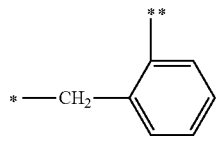 (L1-ex-14)

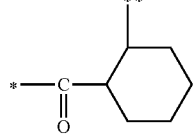 (L1-ex-15)

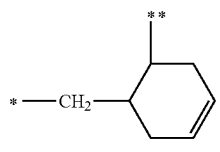 (L1-ex-16)

(L1-ex-17)

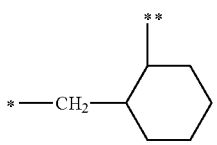

wherein, in Formulae (L1-ex-1) to (L1-ex-17), * represents a position of bonding to a dehydroabietic acid-based skeletal structure; and ** represents a position of bonding to a carbonyl group.

<5> The polyester polymer described in any one of <2> to <4>, wherein $L^2$ represents a single bond or at least one selected from the group consisting of linking groups represented by the following Formulae: (L2-ex-1) to (L2-ex-16):

—O— (L2-ex-1)

—CH₂— (L2-ex-2)

—S— (L2-ex-3)

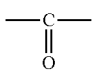 (L2-ex-4)

—SO₂— (L2-ex-5)

—CH=CH— (L2-ex-6)

—CH₂CH₂— (L2-ex-7)

—SCH₂CH₂S— (L2-ex-8)

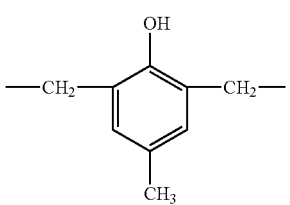 (L2-ex-9)

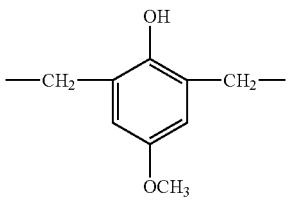 (L2-ex-10)

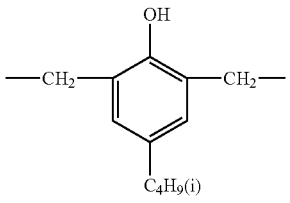 (L2-ex-11)

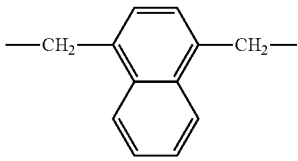 (L2-ex-12)

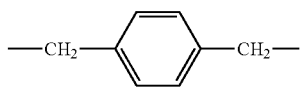 (L2-ex-13)

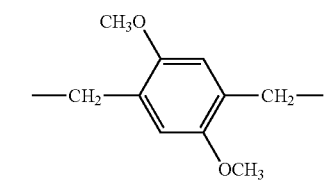 (L2-ex-14)

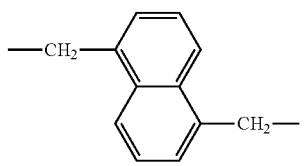 (L2-ex-15)

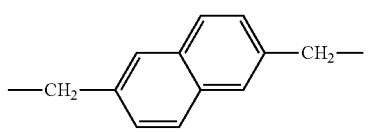 (L2-ex-16)

<6> The polyester polymer described in any one of <3> to <5>, wherein Formula (A1) is represented by the following Formula (A1-ex-1):

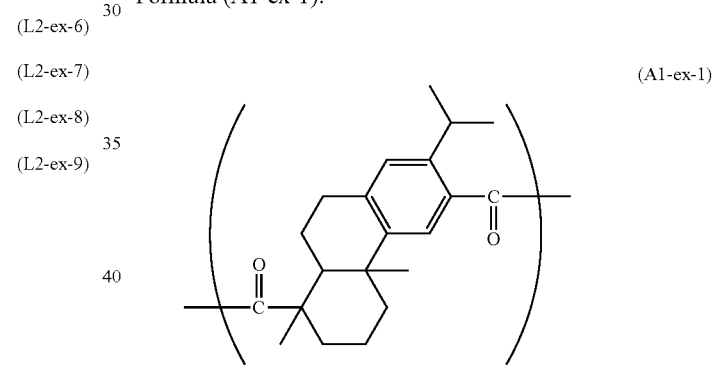 (A1-ex-1)

<7> The polyester polymer described in any one of <3> to <6>, wherein Formula (A2) is represented by the following Formula (A2-ex-1):

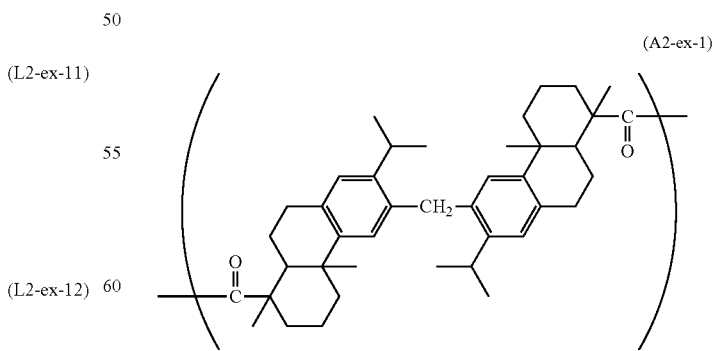 (A2-ex-1)

<8> The polyester polymer described in any one of <1> to <7>, wherein the repeating unit derived from a diol compound contains an aromatic ring group.

<9> The polyester polymer described in any one of <1> to <8>, wherein the repeating unit derived from a diol compound is a repeating unit represented by the following Formula (B2):

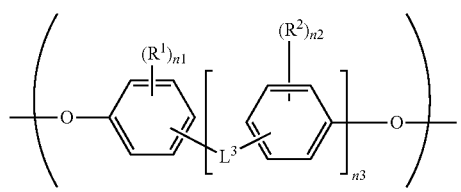

(B2)

wherein in Formula (B2), $L^3$ represents a single bond or a divalent linking group composed of at least one selected from the group consisting of an oxygen atom, a carbonyl group, a sulfonyl group and an alkylene group; when there is more than one $L^3$, each $L^3$ may be respectively identical or different from each other $L^3$; $R^1$ and $R^2$ each independently represent a substituent selected from the group consisting of a halogen atom, an alkyl group and an alkoxy group, wherein re and $R^2$ may be bonded to each other to form a ring; when there is more than one $R^1$ or more than one $R^2$, each $R^1$ or $R^2$ may be respectively identical or different from each other $R^1$ or $R^2$; n1 and n2 each independently represent an integer from 0 to 4; and n3 represents an integer from 0 to 2.

<10> The polyester polymer described in <9>, wherein the repeating unit represented by Formula (B2) is at least one selected from the group consisting of repeating units represented by the following Formulae (B2-ex-1) to (B2-ex-16):

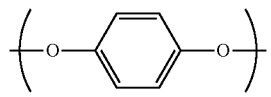

(B2-ex-1)

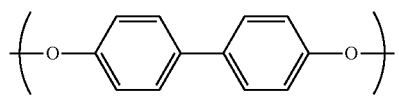

(B2-ex-2)

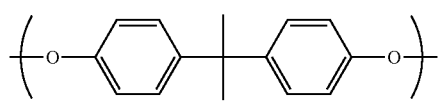

(B2-ex-3)

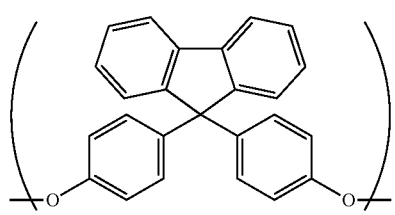

(B2-ex-4)

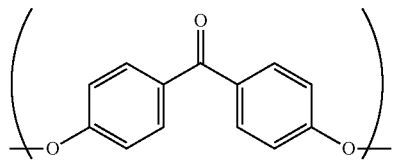

(B2-ex-5)

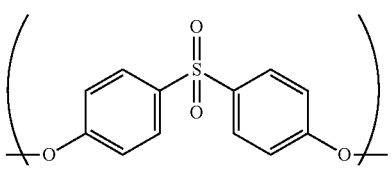

(B2-ex-6)

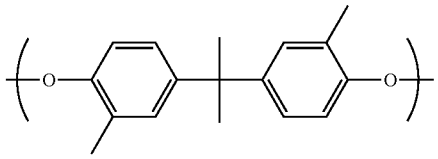

(B2-ex-7)

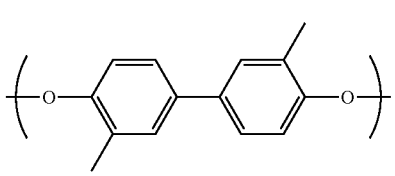

(B2-ex-8)

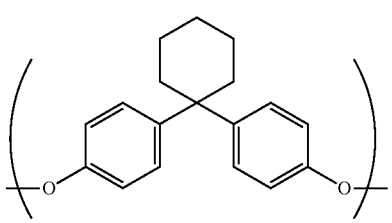

(B2-ex-9)

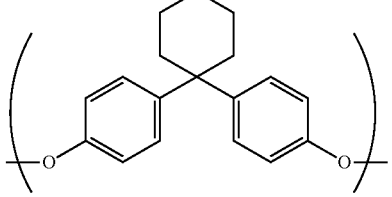

(B2-ex-10)

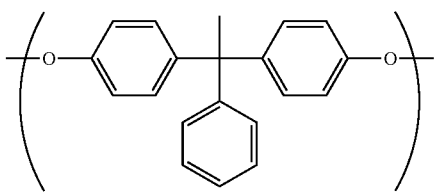

(B2-ex-11)

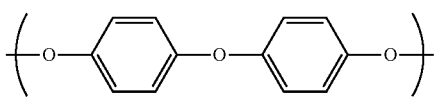

(B2-ex-12)

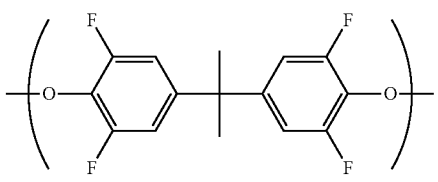

(B2-ex-13)

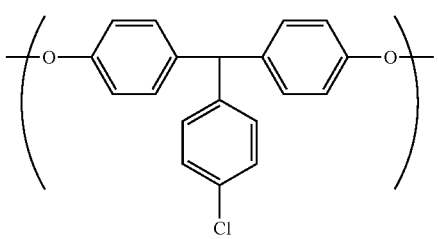

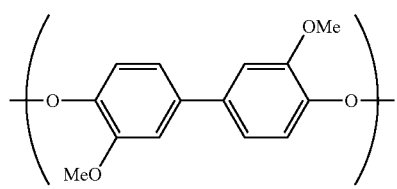
(B2-ex-14)

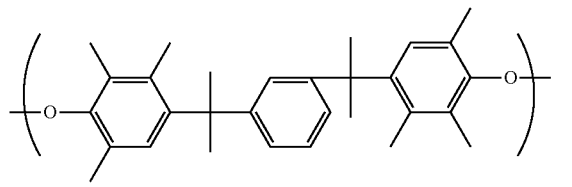
(B2-ex-15)

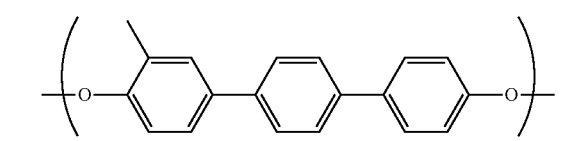
(B2-ex-16)

<11> A resin composition, containing the polyester polymer described in any one of <1> to <10>, and at least one additive selected from the group consisting of a flame retardant and a light stabilizer.

<12> A molded product, containing the polyester polymer described in any one of <1> to <10>.

<13> A film, having a resin layer containing the polyester polymer described in any one of <1> to <10>.

<14> The molded product described in <12>, further containing at least one additive selected from the group consisting of a flame retardant and a light stabilizer.

<15> The film described in <13>, wherein the resin layer further contains at least one additive selected from the group consisting of a flame retardant and a light stabilizer.

Advantageous Effects of Invention

According to the present invention, a polyester polymer which has a main skeletal structure derived from a compound originating from plants and exhibits excellent heat resistance can be provided. Furthermore, a resin composition, a molded product, and a film, which contain the polyester polymer, can be provided.

DESCRIPTION OF EMBODIMENTS

Figure 1:
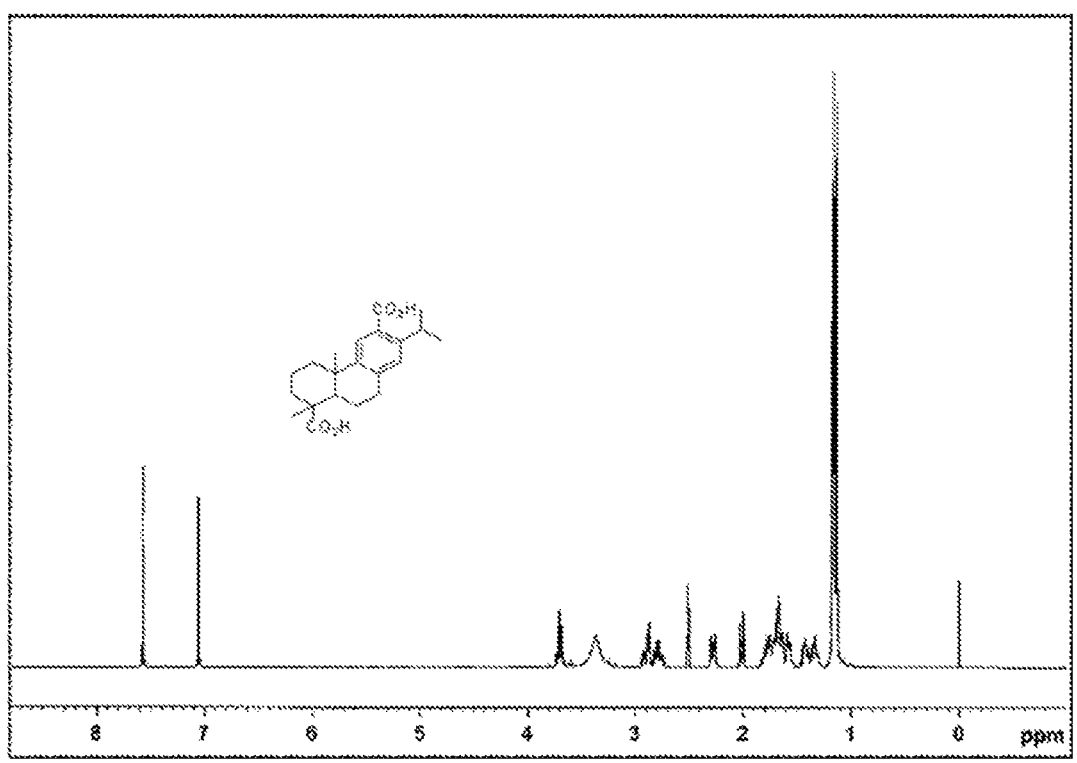
FIG. 1 is a diagram illustrating an example of the $^1$H-NMR spectrum of a dicarboxylic acid compound according to the present Example.

In the present specification, the expression "~(to)" is intended to indicate a range including the numerical values described before and after the symbol as the minimum value and the maximum value, respectively.

<Polyester Polymer>

The polyester polymer (hereinafter, also referred to as "dehydroabietic acid-based polymer") of the present invention includes at least one repeating unit derived from a dicarboxylic acid compound containing a partial structure represented by the following Formula (C) and at least one repeating unit derived from a diol compound containing a cyclic structure, in which the partial structure represented by the following Formula (C) constitutes the main chain. Furthermore, the polyester polymer may optionally further include a repeating unit derived from a dicarboxylic acid compound which does not contain a partial structure represented by Formula (C), and/or a repeating unit derived from a diol compound which does not contain a cyclic structure.

The polyester polymer can constitute a polyester polymer having excellent heat resistance when the polyester polymer contains the partial structure represented by Formula (C) as a portion of the main chain and further has a cyclic structure. Furthermore, the polyester polymer can be formed to have high transparency and low density. This is believed to be because, for example, when the polyester polymer has a cyclic structure in addition to the partial structure represented by Formula (C), the intermolecular bonding strength of the polyester polymer increases.

The polyester polymer exhibits high heat resistance. Furthermore, the partial structure represented by Formula (C) that is carried by the polyester polymer can be derived from dehydroabietic acid (following Formula (A)) which is obtainable from rosin or the like originating from pine resin that is available as a biomass resource.

Therefore, the dehydroabietic acid-based polymer can be supplied as a novel biomass polymer which is superior in terms of heat resistance to conventional biomass polymers such as polylactic acid. Furthermore, the dehydroabietic acid-based polymer can be utilized in applications which make the most of the characteristics of high heat resistance, and can be utilized in various applications in a variety of forms such as, for example, sheets, films, fibers, and molding materials.

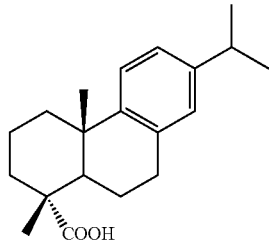
(A)

Hereinafter, the polyester polymer of the present invention will be described in detail. The polyester polymer of the present invention is a copolymer obtainable by using a dicarboxylic acid compound having a partial structure represented by the following Formula (C) and a diol compound having a cyclic structure as raw material monomers, and polymerizing these monomers. The polyester polymer includes a repeating unit containing a skeletal structure represented by the following Formula (C) (hereinafter, referred to as "dehydroabietic acid-based skeletal structure") in the molecular structure such that the dehydroabietic acid-based skeletal structure constitutes a portion of the main chain.

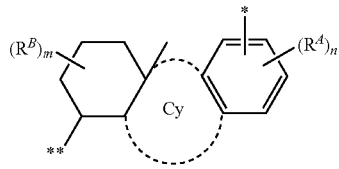
(C)

wherein in the formula, $R^A$ and $R^B$ each independently represent a hydrogen atom or an alkyl group having 1 to 6 carbon atoms; n and m each independently represent an integer from 0 to 2 (preferably 0 or 1, and more preferably 1); Cy represents an unsaturated 6-membered or 7-membered ring which may contain a heteroatom; and * and ** each represent a bonding hand, while * may be a bonding hand extending from $R^A$.

Examples of the alkyl group having 1 to 6 carbon atoms as represented by $R^A$ or $R^B$ include a methyl group, an ethyl group, an (iso)propyl group, a hexyl group, and the like, and an alkyl group having 1 to 3 carbon atoms is preferred. Particularly preferred alkyl groups are a methyl group and an (iso)propyl group.

Examples of the unsaturated 6-membered ring which may contain a heteroatom as represented by Cy include cyclohexene, cyclohexenone and the like, and examples of the unsaturated 7-membered ring include cycloheptene, cycloheptenone and the like.

Furthermore, the heteroatom that may be contained in the ring of Cy is preferably a nitrogen atom, a sulfur atom, or a phosphorus atom. Among these, a more preferred heteroatom is a nitrogen atom.

Cy is preferably cyclohexene.

Furthermore, regarding one of preferred embodiments of the skeletal structure represented by Formula (C), a skeletal structure represented by the following Formula (D) is a preferred embodiment.

In Formula (D), * and ** each represent a bonding hand.

(D)

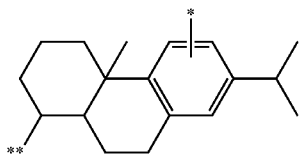

Regarding the dehydroabietic acid-based skeletal structure, the structures described below may be included as preferred structures.

(D-1)

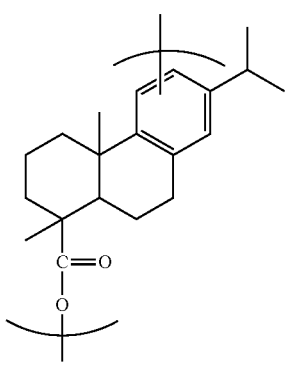

(D-2)

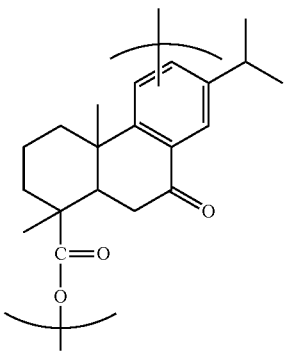

(D-3)

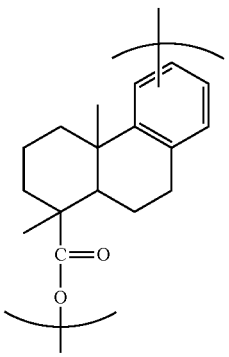

(D-4)

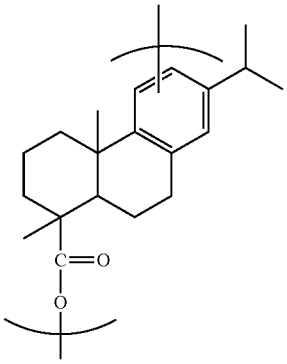

(D-5)

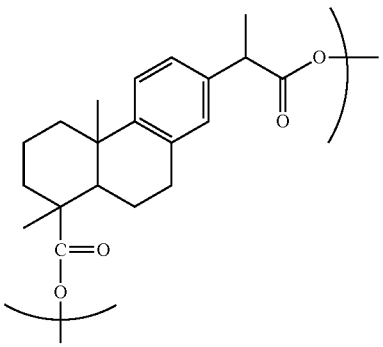

(D-6)
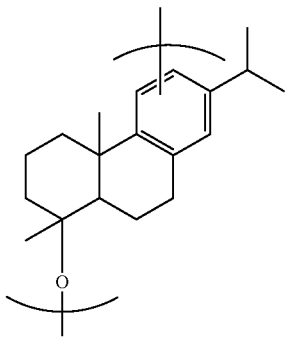

(D-7)
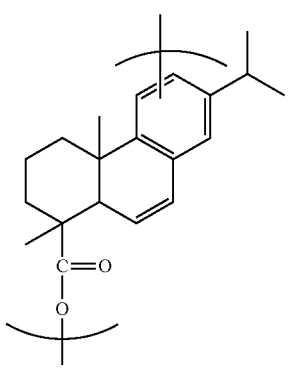

(D-8)
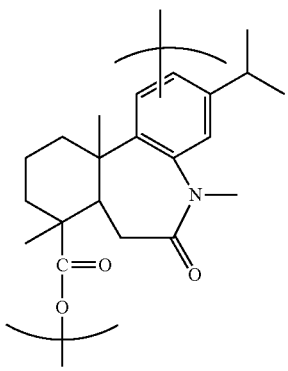

(D-9)
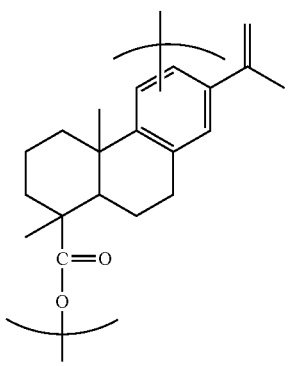

Among the skeletal structures described above, preferred structures are (D-1) and (D-3), and a more preferred structure is (D-1).

The "dehydroabietic acid-based skeletal structure" may further have a substituent. Examples of the substituent that may be carried include an alkyl group having 1 to 6 carbon atoms, an alkoxy group having 1 to 6 carbon atoms, a halogen atom, a hydroxyl group, a nitro group, and an amino group.

Preferred examples among these include a methyl group, an ethyl group, an (iso)propyl group, a chlorine atom, and an iodine atom.

In regard to the polyester polymer, there are no particular limitations on the configuration and bonding form of the repeating unit derived from a dicarboxylic acid compound containing the dehydroabietic acid-based skeletal structure, as long as the polyester polymer contains the partial structure represented by Formula (C), which is the dehydroabietic acid-based skeletal structure, so as to constitute a portion of the main chain.

The weight average molecular weight of the polyester polymer is not particularly limited, and is preferably 5,000 to 700,000, and more preferably 10,000 to 500,000. When the weight average molecular weight is in this range, the polyester polymer has excellent heat resistance, moldability and the like, and is satisfactory in view of industrial utilization.

Meanwhile, the weight average molecular weight according to the present invention is a value obtainable by a molecular weight analysis (calculated relative to polystyrene standards) by gel permeation chromatography (GPC).

The glass transition temperature (Tg) of the polyester polymer is not particularly limited, and is preferably 100° C. or higher, more preferably 150° C. to 400° C., and even more preferably 150° C. to 350° C. When the glass transition temperature is in this range, the polyester polymer has excellent heat resistance, moldability and the like, and is satisfactory in view of industrial utilization.

Meanwhile, the glass transition temperature is measured as an endothermic peak that is observed by using a differential scanning calorimeter in a temperature range of 30° C. to 400° C. under a nitrogen gas stream and under the conditions of a rate of temperature increase of 10° C./min.

The density of the polyester polymer is not limited, and is preferably 1.25 g/cm³ or less, more preferably 0.90 g/cm³ to 1.25 g/cm³, and even more preferably 1.00 g/cm³ to 1.20 g/cm³. When the density is in this range, the polyester polymer has excellent heat resistance, moldability and the like, and is satisfactory in view of industrial utilization.

Meanwhile, the density of the polyester polymer is measured by using a precision density meter under conventional conditions.

The polyester polymer of the present invention has excellent heat resistance while still having moldability. This is speculated to be because the chemostructurally stable tricyclic moiety (tricyclic moiety in Formula (C)) that is carried by the dehydroabietic acid-based skeletal structure is two-dimensionally linked to one another as the main skeletal structure.

As described above, conventional biomass polymers that are obtainable by using biomass resources usually have a problem of exhibiting inferior heat resistance; however, the polyester polymer of the present invention exhibits excellent heat resistance as described above, despite the fact that raw materials originating from biomass resources can be used.

The polyester polymer also includes derivatives of polyester polymers obtained by subjecting polyester polymers having a repeating unit containing a dehydroabietic acid-based skeletal structure to a further chemical treatment.

[Repeating Unit Derived from Dicarboxylic Acid Compound]

With regard to the repeating unit derived from a dicarboxylic acid compound in the polyester polymer of the present invention, the structure of the repeating unit derived from a dicarboxylic acid compound is not particularly limited as long as the repeating unit contains the dehydroabietic acid-based skeletal structure such that the skeletal structure constitutes a portion of the main chain of the polyester polymer. The repeating unit derived from a dicarboxylic acid compound is preferably at least one selected from a repeating unit represented by the following Formula (A10) and a repeating unit represented by the following Formula (A20), from the viewpoint of heat resistance.

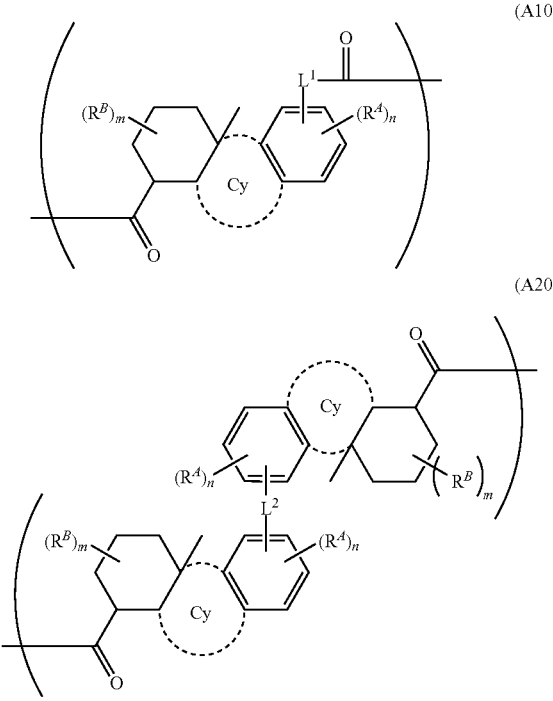

In Formulae (A10) and (A20), $L^1$ represents a divalent linking group composed of at least one selected from the group consisting of an alkylene group, an alkenylene group, an arylene group, an oxygen atom and a carbonyl group, or a single bond. $L^2$ represents a divalent linking group composed of at least one selected from the group consisting of an oxygen atom, a sulfur atom, a carbonyl group, a sulfonyl group, an alkylene group, an alkenylene group and an arylene group, or a single bond. $R^A$, $R^B$, n, m and Cy have the same definitions as $R^A$, $R^B$, n, m and Cy in Formula (C), respectively, and also have the same preferable definitions as $R^A$, $R^B$, n, m and Cy in Formula (C), respectively.

In Formula (A10), $L^1$ represents a divalent linking group composed of at least one selected from the group consisting of an alkylene group, an alkenylene group, an arylene group, an oxygen atom and a carbonyl group, or a single bond. The alkylene group and the alkenylene group may be in the form of a linear or branched chain, or may be cyclic.

$L^1$ is preferably a divalent linking group composed of at least one selected from the group consisting of an alkylene group having 2 to 10 carbon atoms, an alkenylene group having 2 to 10 carbon atoms, an arylene group having 6 to 15 carbon atoms, an oxygen atom and a carbonyl group, or a single bond from the viewpoint of heat resistance; and more preferably a divalent linking group composed of at least one selected from the group consisting of a chain alkylene group having 2 to 4 carbon atoms, a cyclic alkylene group having 5 to 6 carbon atoms, a chain alkenylene group having 2 to 4 carbon atoms, a cyclic alkenylene group having 5 to 6 carbon atoms, an arylene group having 6 to 10 carbon atoms, an oxygen atom and a carbonyl group, or a single bond.

The alkylene group, alkenylene group or arylene group that constitutes the linking group represented by L' or a portion of the linking group may have a substituent, if possible. Examples of the substituent for the alkylene group, alkenylene group or arylene group include an alkyl group, an aryl group, a hydroxyl group, an alkoxy group, and a halogen atom.

Specific examples of the linking group represented by $L^1$ include the following linking groups, but the present invention is not intended to be limited to these. In the following specific examples, * represents the position of bonding to the dehydroabietic acid-based skeletal structure, and ** represents the position of bonding to the carbonyl group.

(L1-ex-1)

(L1-ex-2)

(L1-ex-3)

(L1-ex-4)

(L1-ex-5)

(L1-ex-6)

(L1-ex-7)

(L1-ex-8)

(L1-ex-9)

(L1-ex-10)

(L1-ex-11)

(L1-ex-12)

(L1-ex-13)

(L1-ex-14)

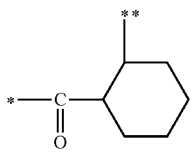 (L1-ex-15)

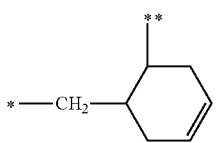 (L1-ex-16)

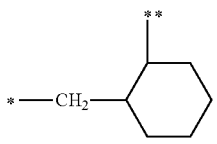 (L1-ex-17)

$L^1$ in Formula (A10) is preferably a single bond, (L1-ex-4), (L1-ex-10), or (L1-ex-12) from the viewpoint of heat resistance, and is more preferably a single bond.

The position of bonding to the dehydroabietic acid-based skeletal structure of $L^1$ may be any of the 11-position, 12-position and 14-position in the case where the isopropyl group of the dehydroabietic acid is assigned the 13-position, and preferably 12-position or 14-position and more preferably the 12-position.

According to one of suitable embodiments of the polyester polymer, a dimer structure formed by bonding two dehydroabietic acid-based skeletal structures directly or through a linking group, is contained in a repeating unit as a portion of the main chain. The repeating unit containing this dimer structure is represented by, for example, the following Formula (A2).

In Formula (A20), $L^2$ represents a divalent linking group composed of at least one selected from the group consisting of an oxygen atom, a sulfur atom, a carbonyl group, a sulfonyl group, an alkylene group, an alkenylene group and an arylene group, or a single bond. The alkylene group and the alkenylene group may be in the form of a linear or branched chain, or may be cyclic.

The linking group represented by $L^2$ is preferably composed of at least one selected from the group consisting of an oxygen atom, a sulfur atom, a carbonyl group, a sulfonyl group, an alkylene group having 2 to 10 carbon atoms, an alkenylene group having 2 to 10 carbon atoms, and an arylene group having 6 to 18 carbon atoms, from the viewpoint of heat resistance. $L^2$ is more preferably a divalent linking group composed of at least one selected from the group consisting of an oxygen atom, a sulfur atom, a carbonyl group, a sulfonyl group, a chain alkylene group having 2 to 4 carbon atoms, a cyclic alkylene group having 5 to 6 carbon atoms, a chain alkenylene group having 2 to 4 carbon atoms, a cyclic alkenylene group having 5 to 6 carbon atoms, and an arylene group having 6 to 8 carbon atoms, or a single bond.

The linking group represented by $L^2$, or the alkylene group, alkenylene group or arylene group that constitutes a portion of the linking group may have a substituent, if possible. Examples of the substituent for the alkylene group, alkenylene group or arylene group include the same examples of the substituent for $L^1$.

Specific examples of the linking group represented by $L^2$ include the following linking groups, but the present invention is not intended to be limited to these.

—O— (L2-ex-1)

—CH$_2$— (L2-ex-2)

—S— (L2-ex-3)

$\underset{\underset{O}{\parallel}}{-C-}$ (L2-ex-4)

—SO$_2$— (L2-ex-5)

—CH=CH— (L2-ex-6)

—CH$_2$CH$_2$— (L2-ex-7)

—SCH$_2$CH$_2$S— (L2-ex-8)

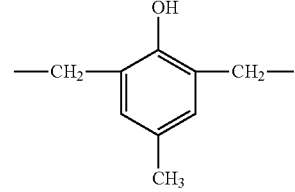 (L2-ex-9)

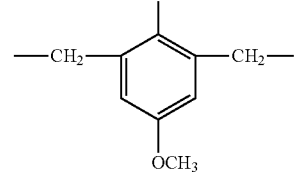 (L2-ex-10)

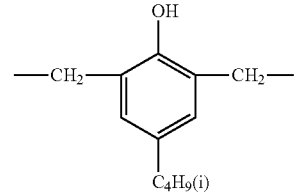 (L2-ex-11)

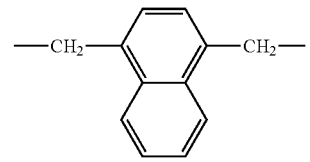 (L2-ex-12)

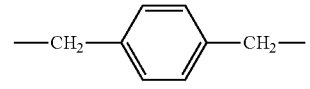 (L2-ex-13)

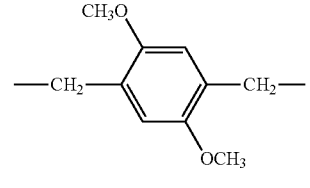 (L2-ex-14)

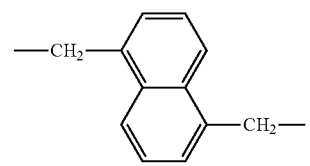 (L2-ex-15)

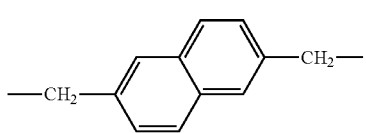
(L2-ex-16)

L² is preferably (L2-ex-2), (L2-ex-5), (L2-ex-9) or (L2-ex-11) from the viewpoint of heat resistance, and more preferably (L2-ex-2).

The positions of bonding to the two dehydroabietic skeletal structure of L² are each independently such that when the isopropyl group of dehydroabietic acid is assigned the 13-position, the position of bonding may be any of the 11-position, 12-position and 14-position, and is preferably the 12-position or the 14-position, while the position of bonding be more preferably the 12-position.

As described above, the repeating unit derived from a dicarboxylic acid compound is preferably at least one selected from a repeating unit represented by Formula (A10) and a repeating unit represented by the following Formula (A20), and is particularly preferably at least one selected from a repeating unit represented by the following Formula (A1) and a repeating unit represented by the following Formula (A2), and heat resistance becomes more satisfactory.

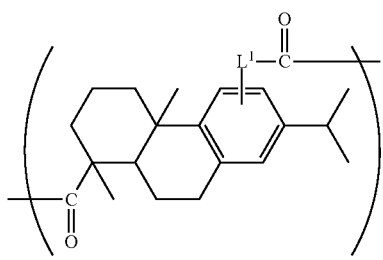
(A1)

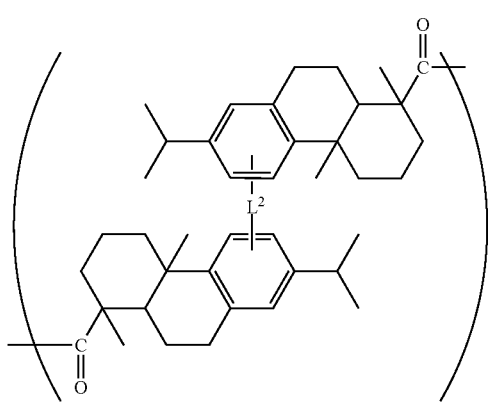
(A2)

In Formula (A1) and Formula (A2), L¹ and L² have the same definitions as L¹ and L² in Formulae (A10) and (A20), respectively, and also have the same preferable definitions.

The total content of the repeating unit represented by Formula (A10) and the repeating unit represented by Formula (A20) in the repeating units derived from dicarboxylic acid compounds that are included in the polyester polymer is not particularly limited. However, when the total amount of the repeating units derived from dicarboxylic acid compounds is set at 50% by mole, from the viewpoints of heat resistance and density, the total content is preferably 10% by mole or more, more preferably 20% by mole or more, even more preferably 30% by mole or more, and still more preferably 40% by mole or more.

The polyester polymer includes at least one kind of a repeating unit derived from a dicarboxylic acid compound containing a dehydroabietic acid-based skeletal structure, and if necessary, the polyester polymer may also include at least one kind of a repeating unit derived from a different dicarboxylic acid compound that does not contain a dehydroabietic acid-based skeletal structure.

Regarding the dicarboxylic acid compound that does not contain a dehydroabietic acid-based skeletal structure, any dicarboxylic acid compound that is usually used to construct a polyester polymer can be used without particular limitations, and for example, the dicarboxylic acid compounds described in Gosei Kobunshi (Synthetic Polymers) V (Asakura Publishing Co., Ltd.) P. 63-91, and the like can be used.

Examples of the dicarboxylic acid compound that does not contain a dehydroabietic acid-based skeletal structure include aromatic dicarboxylic acids such as terephthalic acid, isophthalic acid, and naphthalenedicarboxylic acid; and aliphatic dicarboxylic acids such as cyclohexanedicarboxylic acid, dicyclohexanedicarboxylic acid, and adipic acid.

The content ratio of the repeating unit derived from a dicarboxylic acid compound that does not contain the dehydroabietic acid-based skeletal structure in the polyester polymer is not particularly limited as long as the content ratio is maintained to the extent that the effect of the present invention is not impaired. For example, the content ratio of the repeating unit derived from a dicarboxylic acid compound that does not contain the dehydroabietic acid-based skeletal structure is such that when the total amount of the repeating units derived from a dicarboxylic acid compound in the polyester polymer is set at 50% by mole, the content ratio is preferably 40% by mole or less, and more preferably 30% by mole or less.

[Repeating Unit Derived from Diol Compound]

The polyester polymer of the present invention includes at least one repeating unit derived from a diol compound having a cyclic structure. The cyclic structure contained in the repeating unit derived from a diol compound may be contained in a side chain moiety of the polyester polymer, or may be contained so as to constitute a portion of the main chain. From the viewpoint of heat resistance, it is preferable that the cyclic structure contained in the repeating unit derived from a diol compound constitute a portion of the main chain. Thereby, heat resistance is further enhanced.

The cyclic structure contained in the diol compound may be an aliphatic ring or an aromatic ring, and may be a hydrocarbon ring or a heterocyclic ring. Furthermore, the aliphatic ring may contain an unsaturated bond.

Furthermore, the number of rings that are contained in the diol compound is not particularly limited, for example, the number can be set to 1 to 5. From the viewpoint of heat resistance, the number of rings is preferably 1 to 3, and more preferably 1 to 2. When the diol compound contains two or more rings, the cyclic structure of the diol compound may be a structure in which two or more monocyclic rings are linked by covalent bonding or via a linking group, or may be a fused ring structure.

Specific examples of the repeating unit derived from a diol compound having a cyclic structure include, for example, repeating units derived from cyclohexanediol, cyclohexanedimethanol, 1,4-bis(2-hydroxyethoxy)benzene, 1,4-bis(2-hydroxypropoxy)benzene, and 4-hydroxyethylphenol;

and repeating units derived from a diol compound represented by the following Formula (B2).

The repeating unit derived from a diol compound containing the cyclic structure is preferably a repeating unit derived from a diol compound represented by the following Formula (B2), from the viewpoint of heat resistance.

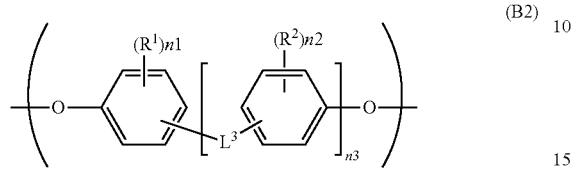
(B2)

In Formula (B2), $L^3$ represents a divalent linking group composed of at least one selected from the group consisting of an oxygen atom, a carbonyl group, a sulfonyl group, and an alkylene group, or a single bond. When there are plural $L^3$'s, the respective $L^3$'s may be identical with or different from each other.

$R^1$ and $R^2$ each independently represent a substituent selected from the group consisting of a halogen atom, an alkyl group and an alkoxy group, and $R^1$ and $R^2$ may be bonded to each other to form a ring. Furthermore, n1 and n2 each independently represent an integer from 0 to 4. When n1 is 2 or greater, the respective $R^1$'s may be identical or different from each other. When n2 is 2 or greater, the respective $R^2$'s may be identical with of different from each other.

n3 Represents an Integer from 0 to 2.

The alkylene group that constitutes the divalent linking group represented by $L^3$ or a portion of the linking group may be a linear or branched chain alkylene group, or may be a cyclic alkylene group. The number of carbon atoms of the alkylene group is preferably 1 to 6, and more preferably 1 to 4, from the viewpoint of heat resistance. In addition, the number of carbon atoms of the alkylene group as used herein is not meant to include the number of carbon atoms of the substituent that will be described below.

Furthermore, the alkylene group may have a substituent such as a chain or cyclic alkyl group having 1 to 6 carbon atoms, or an aryl group having 6 to 18 carbon atoms. The number of substituents in the alkylene group may be 2 or greater, and when the alkylene group has two or more substituents, the two or more substituents may be identical with or different from each other, or may also be linked to each other to form a ring.

$R^1$ and $R^2$ each independently represent a substituent selected from the group consisting of a halogen atom, an alkyl group and an alkoxy group, from the viewpoint of heat resistance, $R^1$ and $R^2$ are each preferably a substituent selected from the group consisting of a fluorine atom, a chlorine atom, an alkyl group having 1 to 8 carbon atoms, and an alkoxy group having 1 to 8 carbon atoms.

n1 and n2 each represent an integer from 0 to 4, preferably an integer from 0 to 2, more preferably 0 or 1, and even more preferably 0.

n3 represents an integer from 0 to 2, preferably 0 or 1.

Specific examples of the repeating unit represented by Formula (B2) will be described below, but the present invention is not intended to be limited to these.

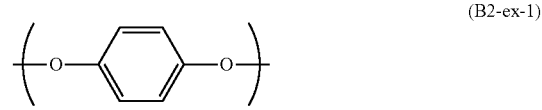
(B2-ex-1)

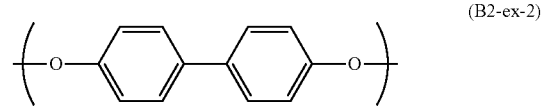
(B2-ex-2)

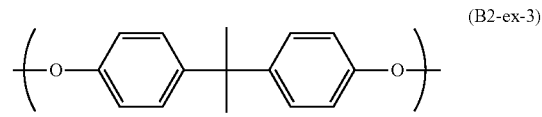
(B2-ex-3)

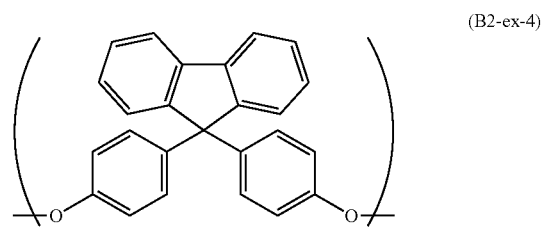
(B2-ex-4)

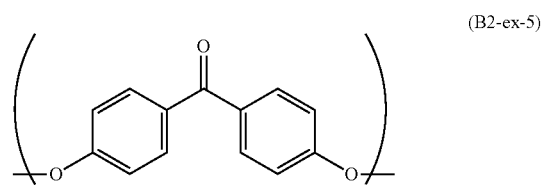
(B2-ex-5)

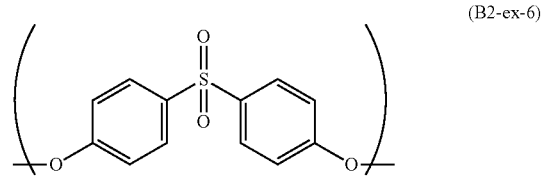
(B2-ex-6)

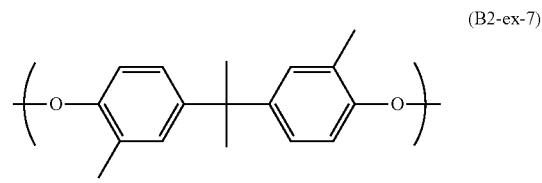
(B2-ex-7)

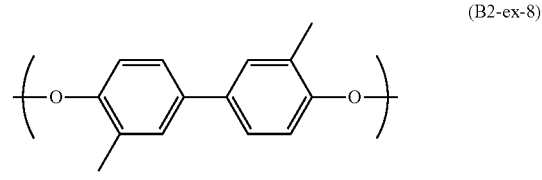
(B2-ex-8)

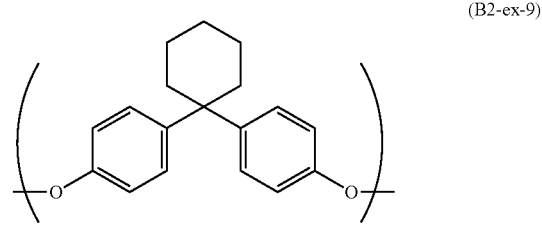
(B2-ex-9)

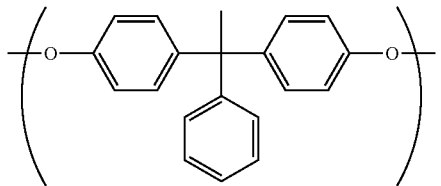
(B2-ex-10)

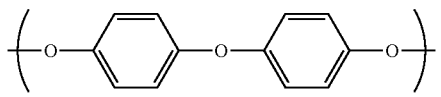
(B2-ex-11)

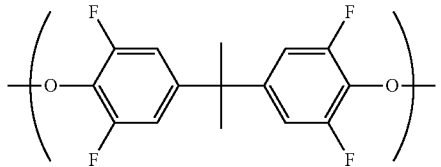
(B2-ex-12)

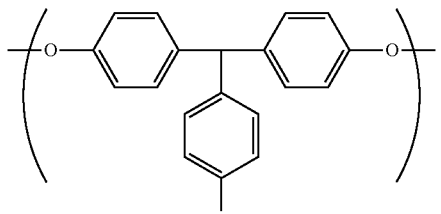
(B2-ex-13)

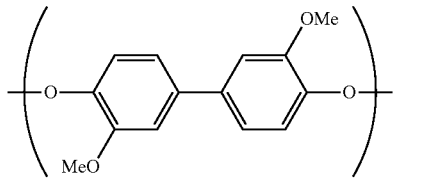
(B2-ex-14)

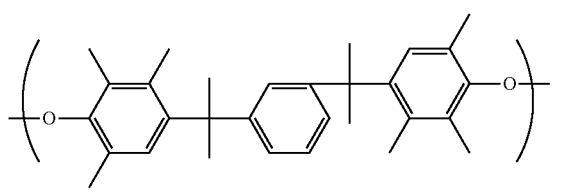
(B2-ex-15)

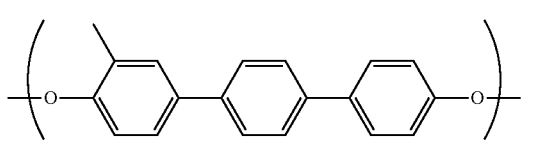
(B2-ex-16)

The repeating unit represented by Formula (B2) is preferably (B2-ex-1), (B2-ex-2), (B2-ex-3), (B2-ex-4), (B2-ex-5), (B2-ex-6), or (B2-ex-11), and more preferably (B2-ex-1), (B2-ex-2) or (B2-ex-3), from the viewpoint of heat resistance.

The content ratio of the repeating unit represented by Formula (B2) of the repeating units derived from diol compounds that are contained in the polyester polymer is not particularly limited. When the total amount of the repeating units derived from diol compounds is set at 50% by mole, from the viewpoints of heat resistance and density, the content ratio is preferably 10% by mole or more, more preferably 20% by mole or more, even more preferably 30% by mole or more, and even more preferably 40% by mole or more.

The polyester polymer includes at least one repeating unit derived from a diol compound containing a cyclic structure, and may optionally include at least one repeating unit derived from a different diol compound that does not contain a cyclic structure.

Regarding the diol compound that does not contain a cyclic structure, any diol compound that is usually used to construct a polyester polymer can be used without particular limitations, and examples thereof include diol compounds such as ethylene glycol, 1,2-propanediol, 1,3-propanediol, 1,4-butanediol, 1,6-hexanediol, 1,8-octanediol, 1,10-decanediol, 1,12-dodecanediol, diethylene glycol, triethylene glycol, and tetraethylene glycol.

The content ratio of the repeating unit derived from a diol compound that does not contain a cyclic structure in the polyester polymer is not particularly limited as long as the content ratio is maintained to the extent that the effect of the present invention is not impaired. For example, the content ratio of the repeating unit derived from a diol compound that does not contain a cyclic structure is such that when the total amount of the repeating unit derived from a diol compound in the polyester polymer is set at 50% by mole, the content ratio is preferably 40% by mole or less, and more preferably 30% by mole or less.

It is preferable from the viewpoint of heat resistance that the polyester polymer of the present invention include, as the repeating unit derived from a dicarboxylic acid compound, at least one of a repeating unit derived from a dicarboxylic acid compound represented by Formula (A1) in which $L^1$ is a single bond or is a moiety represented by Chemical Formula (L1-ex-4), (L1-ex-10) or (L1-ex-12), and a repeating unit derived from a dicarboxylic acid compound represented by Formula (A2) in which $L^2$ is a moiety represented by Chemical Formula (L2-ex-2), (L2-ex-5), (L2-ex-9) or (L2-ex-11); and as the repeating unit derived from a diol compound, at least one repeating unit derived from a diol compound represented by Chemical Formula (B2-ex-1), (B2-ex-2), (B2-ex-3), (B2-ex-4), (B2-ex-5), (B2-ex-6) or (B2-ex-11).

The polyester polymer of the present invention more preferably includes, as the repeating unit derived from a dicarboxylic acid compound, at least one of a repeating unit represented by Formula (A1) in which $L^1$ is a single bond, and a repeating unit derived from a dicarboxylic acid compound represented by Formula (A2) in which $L^2$ is (L2-ex-2); and as the repeating unit derived from a diol compound, at least one repeating unit derived from a diol compound represented by Chemical Formula (B2-ex-1), (B2-ex-2), (B2-ex-3) or (B2-ex-4).

The polyester polymer of the present invention even more preferably includes, as the repeating unit derived from a dicarboxylic acid compound, at least one selected from the following Chemical Formula (A1-ex-1) and (A2-ex-1); and as the repeating unit derived from a diol compound, at least one repeating unit derived from a diol compound represented by Chemical Formula (B2-ex-1), (B2-ex-2), (B2-ex-3) or (B2-ex-4).

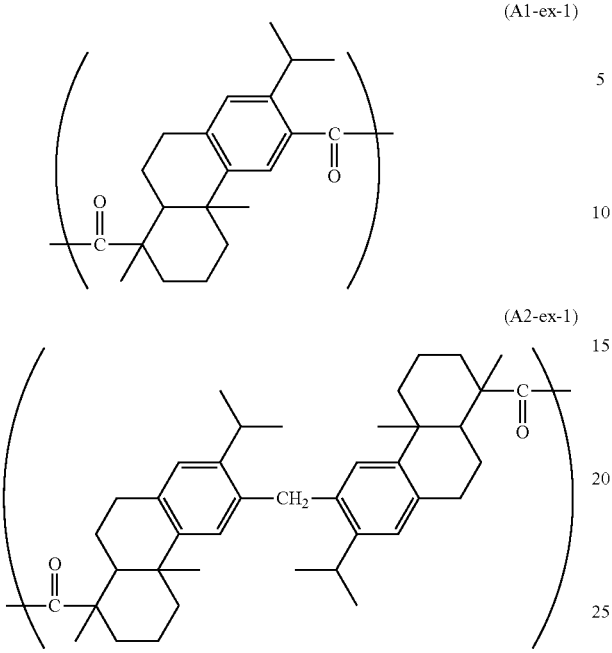

(A1-ex-1)

(A2-ex-1)

The content ratio of the repeating unit derived from a dicarboxylic acid compound and the repeating unit derived from a diol compound that constitute the polyester polymer of the present invention (repeating unit derived from a dicarboxylic acid:repeating unit derived from a diamine compound) is not particularly limited, and the content ratio is usually 1:1.

[Method for Producing Polyester Polymer]

The method for producing a polyester polymer of the present invention will be described.

The dehydroabietic acid used in the production of the polyester polymer of the present invention can be obtained from, for example, rosin.

Rosin is a resin component collected from pine resin, and there are three kinds, namely, "gum rosin", "tall rosin" and "wood rosin", which are classified based on the method of collection. The constituent components contained in rosin may vary with the method for collecting these rosins or the producing district of pine, androsin is generally a mixture of diterpene-based resin acids such as abietic acid (1), neoabietic acid (2), palustric acid (3), levopimaric acid (4), dehydroabietic acid (5), pimaric acid (6), and isopimaric acid (7), whose structures are presented below.

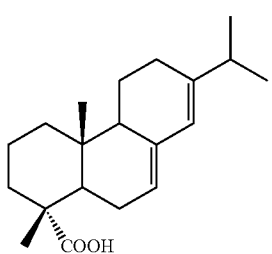

(1)

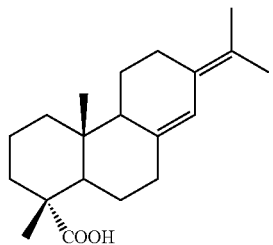

(2)

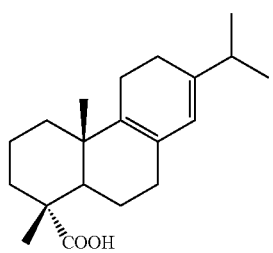

(3)

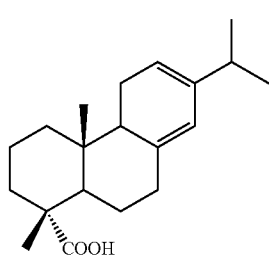

(4)

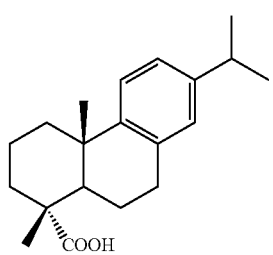

(5)

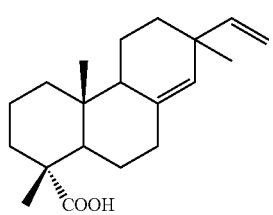

(6)

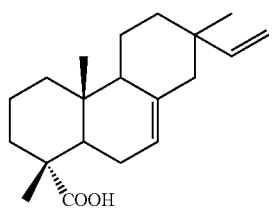

(7)

Among these diterpene-based resin acids, the various compounds represented by (1) to (4) undergo disproportionation when subjected to heating in the presence of a certain kind of metal catalyst, and are modified to dehydroabietic acid (5) and dihydroabietic acid (8) having a structure described below.

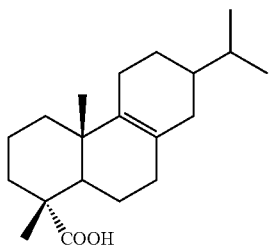

(8)

That is, dehydroabietic acid (5) that is needed to produce the polyester polymer of the present invention can be relatively easily obtained by subjecting rosin, which is a mixture of various resin acids, to an appropriate chemical treatment, and thus can be industrially inexpensively produced. In addition, dihydroabietic acid (8) and dehydroabietic acid (5) can be easily separated by a known method.

The polyester polymer of the present invention can be synthesized by, for example, a synthetic route 1 or a synthetic route 2 that will be described below.

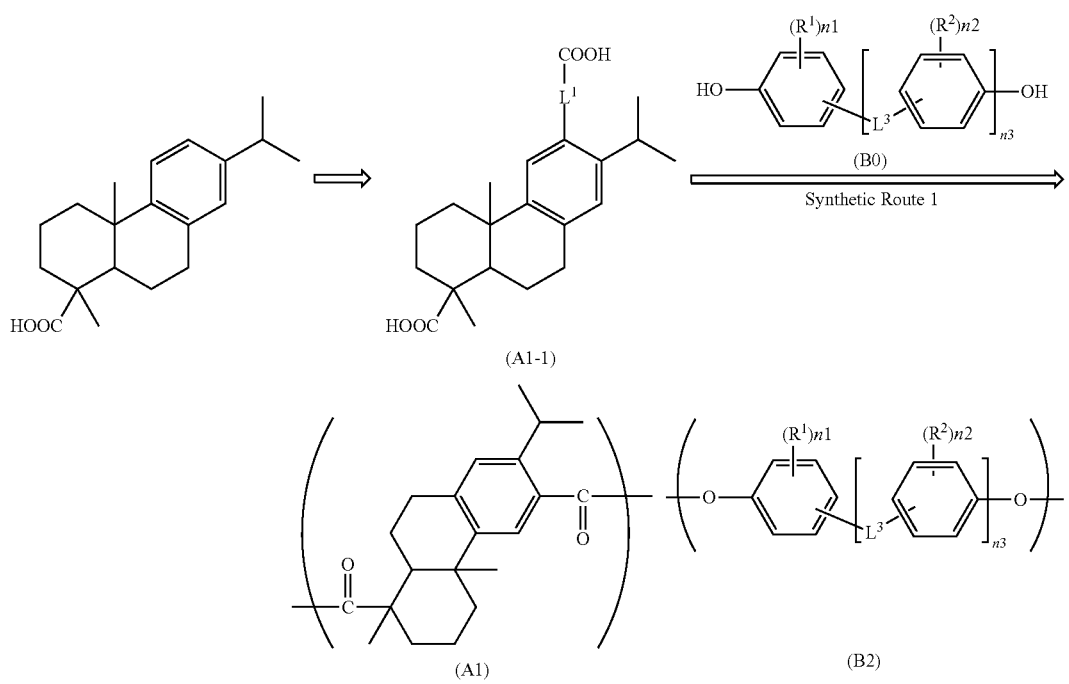

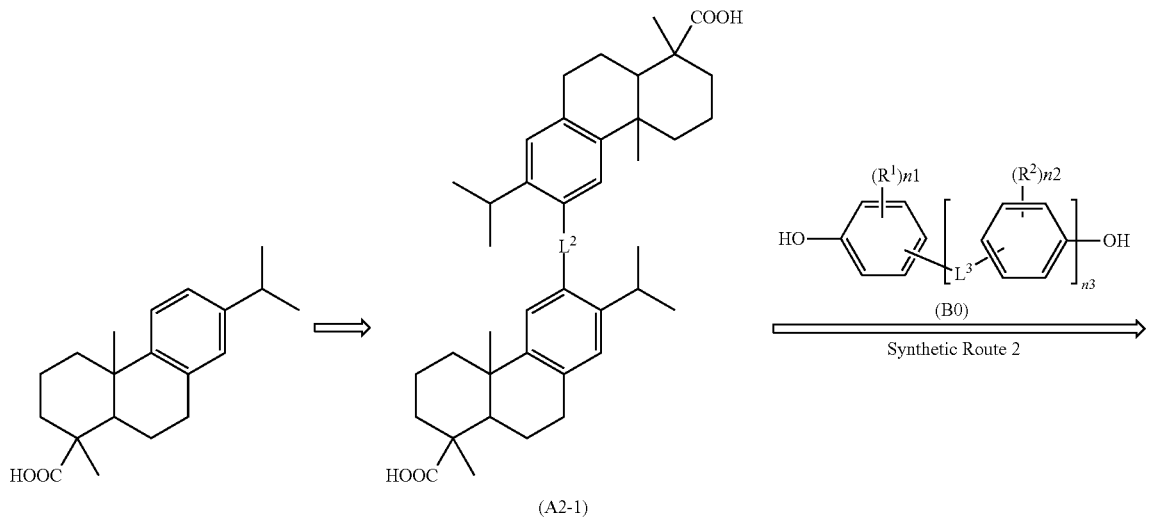

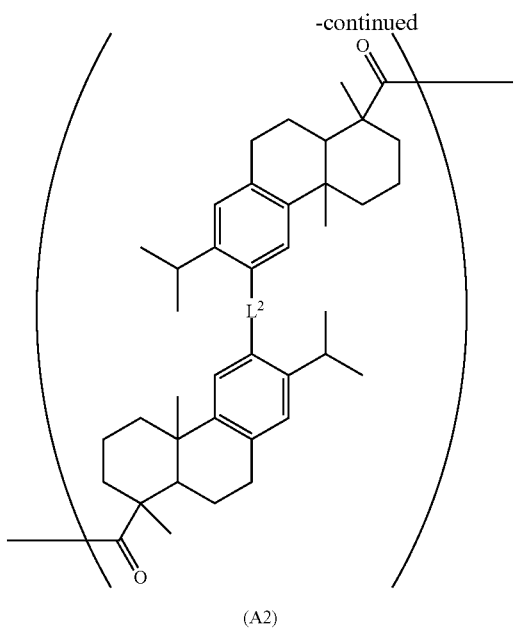

(A2)

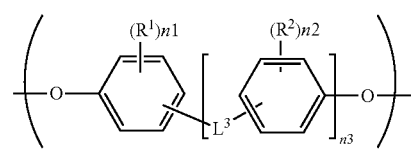

(B2)

In the synthetic route 1 and the synthetic route 2, $L^1$, $L^2$, $L^3$, $R^1$, $R^2$, n1, n2 and n3 have the same definitions as $L^1$, $L^2$, $L^3$, $R^1$, $R^2$, n1, n2 and n3 in Formula (A1), Formula (A2) and Formula (B2), and also have the same preferable definitions as those.

Furthermore, in the synthetic route 1 and synthetic route 2, examples of using formula (A1-1) or (A2-1) alone as the dicarboxylic acid compound are disclosed, and a polyester polymer can also be obtained by using a dicarboxylic acid compound represented by Formula (A1-1) and a dicarboxylic acid compound represented by Formula (A2-1) in combination.

Hereinafter, in the synthetic route 1 and synthetic route 2, the process of synthesizing a polyester polymer, which is a final product, from a compound represented by Formula (A1-1) or a compound represented by Formula (A2-1) and a diol compound (B0) (process shown in the synthetic route 1 and the synthetic route 2) will be described in detail. Meanwhile, detailed synthesis examples for the polyester polymer based on the synthetic route 1 and the synthetic route 2 will be more specifically described in the Examples that will be described below.

In the following descriptions, synthetic routes which use each of the compound represented by Formula (A1-1) and the compound represented by Formula (A2-1) singly are disclosed as the synthetic route 1 and the synthetic route 2. However, the same also applies to the process of synthesizing a polyester polymer by using the compound represented by Formula (A1-1) and the compound represented by Formula (A2-1) in combination.

In the synthetic route 1, the polyester polymer having a repeating unit represented by Formula (A1) and the repeating unit represented by Formula (B2) can be synthesized by polycondensing a diol compound (B0) and a dicarboxylic acid compound represented by Formula (A1-1) or a dicarboxylic acid halide derivative or a diester derivative, which are derivatives of the dicarboxylic acid compound, by a known method.

Furthermore, in the synthetic route 2, the polyester polymer having a repeating unit represented by Formula (A2) and a repeating unit represented by Formula (B2) can be synthesized by polycondensing a diol compound (B0) and a dicarboxylic acid compound represented by Formula (A2-1) or a dicarboxylic acid halide derivative or a diester derivative, which are derivatives of the dicarboxylic acid compound, by a known method.

Examples of specific synthesis methods include the methods described in Shin Kobunshi Jikkengaku (New Polymer Experimentology) 3, Kobunshi no Gosei Hanno (Synthesis and Reaction of Polymers) (2), pages 78 to 95, Kyoritsu Shuppan Co., Ltd. (1996) (for example, melt polymerization methods such as a trans-esterification method, a direct esterification method, and an acid halide method; a low temperature solution polymerization method, a high temperature solution polycondensation method, and an interfacial polycondensation method). In the present invention, an acid chloride method and an interfacial polycondensation method in particular are preferably used.

The trans-esterification method is a method of synthesizing a polyester polymer by subjecting a diol compound (B0) and a dicarboxylic acid ester to dealcoholation polycondensation by heating the compounds in a molten state or a solution state, and if necessary, in the presence of a catalyst.

The direct esterification method is a method of synthesizing a polyester polymer by subjecting a diol compound (B0) and a dicarboxylic acid compound (A1-1 or A2-1) to dehydration polycondensation in a molten state or a solution state in the presence of a catalyst under heating.

The acid halide method is a method of synthesizing a polyester polymer by subjecting a diol compound (B0) and a dicarboxylic acid halide derivatives to dehydrohalogenation polycondensation by heating the compounds in a molten state or a solution state, if necessary, in the presence of a catalyst.

The interfacial polymerization method is a method of synthesizing a polyester polymer by dissolving a diol compound (B0) in water while dissolving the dicarboxylic acid compound or a derivative thereof in an organic solvent, and subjecting the compounds to polycondensation at the interface of water/organic solvent by using a phase transfer catalyst.

The polyester polymer (dehydroabietic acid-based polymer) of the present invention described above can be used alone as a polymer material. Furthermore, by mixing the polyester polymer of the present invention with various materials, resin compositions and composite materials can also be obtained. Hereinafter, a resin composition and a composite material that contain the polyester polymer of the present invention will be described.

<Resin Composition>

The polyester polymer of the present invention can be used as a resin composition when mixed with various additives for the purpose of adjusting the properties to desired ranges. The resin composition preferably includes at least one kind of the polyester polymer and at least one additive selected from the group consisting of a flame retardant and a light stabilizer, and may further include other additives as necessary.

(Flame Retardant)

The resin composition preferably includes at least one flame retardant. The flame retardant is a material which makes material including polymers difficult to burn, or which prevents flames from spreading.

The flame retardant is not particularly limited, and conventionally used agents can be used. Examples thereof include bromine-based flame retardants, chlorine-based flame retardants, phosphorus-containing flame retardants, silicon-containing flame retardants, nitrogen compound-based flame retardants, and inorganic flame retardants.

The flame retardant is preferably a phosphorus-containing flame retardant and a silicon-containing flame retardant, both of which do not contain halogen.

Phosphorus-containing flame retardants and silicon-containing flame retardants that do not contain halogen do not undergo thermal decomposition at the time of compounding with the polyester polymer or molding processing, which leads to the generation of hydrogen halide, and therefore, do not cause corrosion of processing machines and molds or deterioration of the working environment. Furthermore, phosphorus-containing flame retardants and silicon-containing flame retardants that do not contain halogen do not cause generation of harmful substances such as dioxins as a result of volatilization of halogens or decomposition at the time of disposal by incineration, and therefore have a reduced possibility of exerting adverse effects on the environment.

—Phosphorus-Containing Flame Retardant—

The phosphorus-containing flame retardants are not particularly limited, and phosphorus-containing flame retardants that are conventionally used can be used. Examples thereof include organophosphorus-based compounds such as phosphoric acid esters, phosphoric acid condensation esters, and polyphosphates.

Specific examples of phosphoric acid esters include trimethyl phosphate, triethyl phosphate, tributyl phosphate, tri(2-ethylhexyl)phosphate, tributoxyethyl phosphate, triphenyl phosphate, tricresyl phosphate, trixylenyl phosphate, tris(isopropylphenyl)phosphate, tris(phenylphenyl)phosphate, trinaphthyl phosphate, cresyl diphenyl phosphate, xylenyl diphenyl phosphate, diphenyl (2-ethylhexyl)phosphate, di(isopropylphenyl)phenyl phosphate, monoisodecyl phosphate, 2-acryloyloxyethyl acid phosphate, 2-methacryloyloxyethyl acid phosphate, diphenyl-2-acryloyloxyethyl phosphate, diphenyl-2-methacryloyloxyethyl phosphate, melamine phosphate, dimelamine phosphate, melamine pyrophosphate, triphenyl phosphine oxide, tricresyl phosphine oxide, diphenyl methanephosphonate, and diethyl phenylphosphonate.

Specific examples of phosphoric acid condensation esters include aromatic phosphoric acid condensation esters such as resorcinol polyphenyl phosphate, resorcinol poly(di-2,6-xylyl)phosphate, bisphenol A polycresyl phosphate, hydroquinone poly(2,6-xylyl)phosphate, and condensation products thereof.

Specific examples of polyphosphates include salts of polyphosphoric acid with any of the metals of Group 1 to Group 14 of the Periodic Table of Elements, ammonia, aliphatic amines and aromatic amines. Representative salts of polyphosphates include, as metal salts, lithium salt, sodium salt, calcium salt, barium salt, iron(II) salt, iron(III) salt, and aluminum salt; as aliphatic amine salts, methylamine salt, ethylamine salt, diethylamine salt, triethylamine salt, ethylenediamine salt, and piperazine salt; and as aromatic amine salts, pyridine salt, and triazine salt.

In addition to those described above, examples of phosphorus-containing flame retardants include halogen-containing phosphoric acid esters such as trischloroethyl phosphate, trisdichloropropyl phosphate, and tris(β-chloropropyl)phosphate; and phosphazene compounds and phosphoric acid ester amides, all having a structure in which phosphorus atoms and nitrogen atoms are linked by double bonds.

The phosphorus-containing flame retardants may be used singly or in combination of two or more kinds.

—Silicon-Containing Flame Retardant—

There are no particular limitations on the silicon-containing flame retardant, and silicon-containing flame retardants that are conventionally used can be used.

For example, examples of silicon-containing flame retardants include organosilicon compounds having a two-dimensional or three-dimensional structure which includes a structural unit represented by the following formula as a main constituent unit.

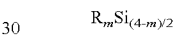

$$R_m Si_{(4-m)/2} \quad \text{Formula}$$

In the above formula, in represents an integer from 1 to 3; and R represents a hydrogen atom, a substituted or unsubstituted aliphatic hydrocarbon group or aromatic hydrocarbon group.]

Other examples of silicon-containing flame retardants include polydimethylsiloxane, and products obtained by substituting or modifying the methyl group in a side chain or at an end of a polydimethylsiloxane with a hydrogen atom, a substituted or unsubstituted aliphatic hydrocarbon group or aromatic hydrocarbon group.

Examples of the substituted or unsubstituted aliphatic hydrocarbon group and aromatic hydrocarbon group include an alkyl group, a cycloalkyl group, a phenyl group, a benzyl group, an amino group, an epoxy group, a polyether group, a carboxyl group, a mercapto group, a chloroalkyl group, an alkyl-higher alcohol ester group, an alcohol group, an aralkyl group, a vinyl group, and a trifluoromethyl group.

Other examples of the silicon-containing flame retardants include so-called silicone oils and modified silicone oils.

The silicon-containing flame retardants may be used singly or in combination of two or more kinds.

—Other Flame Retardants—

Examples of flame retardants other than the phosphorus-containing flame retardants and silicon-containing flame retardants described above include magnesium hydroxide, aluminum hydroxide, antimony trioxide, antimony pentaoxide, sodium antimonate, zinc hydroxystannate, zinc stannate, metastannic acid, tin oxide, tin oxide salts, zinc sulfate, zinc oxide, ferrous oxide, ferric oxide, stannous oxide, stannic oxide, zinc borate, ammonium borate, ammonium octamolybdenate, metal salts of tungstic acid, composite oxides of tungsten and metalloids, ammonium sulfamate, ammonium bromide, zirconium-based compounds, guanidine-based compounds, fluorine-based compounds, graphite, and swellable graphite.

Among them, magnesium hydroxide and aluminum hydroxide are preferable because they do not easily generate substances that are harmful to human body or produce environmentally harmful substances at the time of fire, and are excellent in view of the flame retardant effect and environmental safety.

These flame retardants may be used singly or in combination of two or more kinds.

The content of the flame retardant in the resin composition is not particularly limited, and it is preferable that the flame retardant be included in an amount of usually about 50 parts by mass or less, and preferably about 2 to 30 parts by mass, relative to 100 parts by mass of the resin composition. When the content is set to this range, desired flame retardancy may be obtained while transparency or mechanical properties such as elastic modulus are maintained satisfactorily.

(Light Stabilizer)

The resin composition preferably contains at least one light stabilizer. A light stabilizer is a material which prevents or delays light-induced deterioration of materials including polymers.

There are no particular limitations on the light stabilizer, and compounds that are conventionally used can be used. Examples include hindered amine-based light stabilizers (HALS), ultraviolet absorbers, and single oxygen quenchers. These light stabilizers may be used singly, or two or more kinds may be used in combination.

—High Molecular Weight Hindered Amine-Based Light Stabilizer—

Regarding the HALS, high molecular weight compounds having a molecular weight of more than 1000 are preferably used. Examples of such HALS include poly[{6-(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}], which is an oligomer type HALS, and a succinicaciddimethyl-1-(2-hydroxyethyl)-4-hydroxy-2,2,6,6-tetramethylpiperidine polycondensate. More specifically, products that are commercially available under the trade names of CHIMASSORB 944LD, TINUVIN 622LD (all manufactured by BASF Japan, Ltd.) and the like can be used.

The content of the high molecular weight HALS in the resin composition is preferably 0.2 to 10 parts by mass relative to 100 parts by mass of the resin composition. When the content of the high molecular weight HALS is 0.2 parts by mass or more, intended sufficient weather resistance can be obtained. Furthermore, when the content of the high molecular weight HALS is 10 parts by mass or less, a weather resistance enhancing effect induced by weight increase can be expected, and a decrease in mechanical strength or the occurrence of blooming can be suppressed.

—Low Molecular Weight Hindered Amine-Based Light Stabilizer—

Regarding the HALS, low molecular weight compounds having a molecular weight of 1000 or less are also preferably used. A low molecular weight HALS is more preferably a compound having a molecular weight of 900 or less, and even more preferably a compound having a molecular weight of from 600 to 900.

Examples of the low molecular weight HALS include tris(2,2,6,6-tetramethyl-4-piperidyl)benzene-1,3,5-tricarboxylate, tris(2,2,6,6-tetramethyl-4-piperidyl)-2-acetoxypropane-1,2,3-tricarboxylate, tris(2,2,6,6-tetramethyl-4-piperidyl)-2-hydroxypropane-1,2,3-tricarboxylate, tris(2,2,6,6-tetramethyl-4-piperidyl)triazine-2,4,6-tricarboxylate, tris(2,2,6,6-tetramethyl-4-piperidyl)butane-1,2,3-tricarboxylate, tetrakis(2,2,6,6-tetramethyl-4-piperidyl)propane-1,1,2,3-tetracarboxylate, tetrakis(2,2,6,6-tetramethyl-4-piperidyl)-1,2,3,4-butanetetracarboxylate, tetrakis(1,2,2,6,6-pentamethyl-4-piperidyl)-1,2,3,4-butanetetracarboxylate, and bis(1,2,2,6,6-pentamethyl-4-piperidyl) 2-(3,5-di-t-butyl-4-hydroxybenzyl)-2-n-butylmalonate. More specifically, products that are commercially available under the trade names of ADEKA STAB LA-57, ADEKASTAB LA-52 (all manufactured by Adeka Corp.), TINUVIN 144 (manufactured by BASF Japan, Ltd.), and the like can be used.

The content of the low molecular weight HALS in the resin composition is preferably 0.2 parts to 10 parts by mass relative to 100 parts by mass of the resin composition. When the content of the low molecular weight HALS is 0.2 parts by mass or more, intended sufficient weather resistance can be obtained. Furthermore, when the content of the low molecular weight HALS is 10 parts by mass or less, a weather resistance enhancing effect induced by weight increase can be expected, and a decrease in mechanical strength or the occurrence of blooming can be suppressed.

—Ultraviolet Absorber—

Examples of ultraviolet absorbers include benzotriazole-based ultraviolet absorbers such as 2-(2'-hydroxy-3',5'-di-t-butylphenyl)benzotriazole, 2-(3,5-di-t-amyl-2-hydroxyphenyl)benzotriazole, 2-(2'-hydroxy-5'-methylphenyl)benzotriazole, 2-(2'-hydroxy-5'-t-octylphenyl)benzotriazole, 2-(2'-hydroxy-3',5'-di-t-amylphenyl)benzotriazole, 2-[2'-hydroxy-3'-(3",4"5",6"-tetrahydrophthalimidomethyl)-5'-methylphenyl]benzotriazole, 2,2'-methylenebis[4-(1,1,3,3-tetramethylbutyl)-6-(2H-benzotriazol-2-yl)phenol], 2-[2-hydroxy-3,5-bis(α,α-dimethylbenzyl)phenyl]-2H-benzotriazole, 2-(2-hydroxy-4-octyloxyphenyl)-2H-benzotriazole, and 2-(2H-benzotriazol-2-yl)-4-methyl-6-(3,4,5,6-tetrahydrophthalimidylmethyl)phenol; benzophenone-based ultraviolet absorbers such as 2-hydroxy-4-methoxybenzophenone, 2,4-dihydroxybenzophenone, 2,2'-dihydroxy-4-methoxybenzophenone, 2,2'-dihydroxy-4,4'-dimethoxybenzophenone, 2-hydroxy-4-n-octoxybenzophenone, 2,2',4,4'-tetrahydroxybenzophenone, 4-dodecyloxy-2-hydroxybenzophenone, 3,5-di-t-butyl-4-hydroxybenzoylbenzoic acid n-hexadecyl ester, 1,4-bis(4-benzoyl-3-hydroxyphenoxy)butane, and 1,6-bis(4-benzoyl-3-hydroxyphenoxy)hexane; and cyanoacrylate-based ultraviolet absorbers such as ethyl-2-cyano-3,3-diphenyl acrylate as representative. More specifically, products that are commercially available under the trade names of TINUVIN 320, TINUVIN 328, TINUVIN 234, TINUVIN 1577, TINUVIN 622 (all manufactured by BASF Japan, Ltd.), ADEKASTAB LA-31 (manufactured by Adeka Corp.), SEESORB 102, SEESORB 103, SEESORB 501 (manufactured by Shipro Kasei Kaisha, Ltd.) can be used.

The content of the ultraviolet absorber in the resin composition is preferably 0.2 parts to 10 parts by mass relative to 100 parts by mass of the resin composition. When the content of the ultraviolet absorber is 0.2 parts by mass or more, intended sufficient weather resistance can be obtained. Furthermore, when the content of the ultraviolet absorber is 10 parts by mass or less, a weather resistance enhancing effect induced by weight increase can be expected, and a decrease in mechanical strength or the occurrence of blooming can be suppressed.

—Singlet Oxygen Quencher—

Examples of singlet oxygen quenchers include benzenesulfonic acid nickel salt, p-toluenesulfonic acid nickel salt, dimethyldithiocarbamic acid nickel salt, di-n-butyldithiocarbamic acid nickel salt, tetrabutylphosphonium bis(1,2-benzenedithiolato)nickelate(III), and tetrabutylphosphonium bis(4-methyl-1,2-benzenedithiolato)nickelate(III).

The content of the single oxygen quencher in the resin composition is preferably 0.2 parts to 10 parts by mass relative to 100 parts by mass of the resin composition. When the content of the singlet oxygen quencher is 0.2 parts by mass or more, intended sufficient weather resistance can be obtained. Furthermore, when the content of the singlet oxygen quencher is 10 parts by mass or less, a weather resistance enhancing effect induced by weight increase can be expected, and a decrease in mechanical strength or the occurrence of blooming can be suppressed.

The resin composition may also contain other additives as necessary. The other additives can be appropriately selected from those conventionally used additives according to the purpose. Examples of the other additives include a plasticizer, a stabilizer, an impact resistance enhancer, a crystal nucleating agent, a lubricating agent, an antistatic agent, a surfactant, a pigment, a dye, a filler, an oxidation inhibitor (hindered phenol-based compounds and phosphorous acid ester-based compounds), a moisture absorption inhibitor, a processing aid, a drip preventing agent, a mold releasing agent (fatty acids, fatty acid metal salts, oxyfatty acids, fatty acid esters, partially saponified aliphatic esters, paraffin, low molecular weight polyolefins, fatty acid amides, alkylenebisfatty acid amides, aliphatic ketones, fatty acid lower alcohol esters, fatty acid polyhydric alcohol esters, fatty acid polyglycol esters, and modified silicones), an antifogging agent, an antibacterial agent, and an antifungal agent. These may be used singly, or two or more kinds may be used in combination.

<Composite Material>

The polyester polymer of the present invention can be mixed with various materials and used as composite materials, for the purpose of adjusting the properties to desired scopes.

Particularly important factors in the case of making a composite material from a polyester polymer are polymer alloying (mixing with different kinds of polymers) and incorporation of a filler, and thereby, impact resistance, heat resistance, durability, moldability and the like can be improved.

Regarding the polymers used for polymer alloying, two or more kinds of polyester polymers having different polymer characteristics may be used, or a polyester polymer and a polymer other than that may be used in combination.

Examples of the polymer other than the polyester polymer of the present invention, which may be used for the polymer alloying, include the following 1) to 4).

1) Olefinic resins (homopolymers of α-olefins such as ethylene, propylene, 1-butene, 1-pentene, 1-hexene, and 4-methyl-1-pentene, or cycloolefins such as cyclopentene, cyclohexene, cyclooctene, cyclopentadiene, 1,3-cyclohexadiene, bisyclo[2.2.1]hept-2-ene, tricyclo[4.3.0.1$^{2,5}$]deca-3,7-diene, and tetracyclo[4.4.0.1$^{2,5}$.1$^{7,10}$]dodec-3-ene; copolymers of the aforementioned α-olefins, and copolymers of α-olefins and other monomers capable of copolymerizing with α-olefins, vinyl acetate, maleic acid, vinyl alcohol, methacrylic acid, methyl methacrylate, ethyl methacrylate, and the like).

2) Polyester-based resins (copolymers of a dicarboxylic acid monomer such as terephthalic acid, isophthalic acid, 2,6-naphthalenedicarboxylic acid, 1,4-naphthalenedicarboxylic acid, succinic acid, adipic acid or sebacic acid, and a diol or a polyhydric alcohol monomer such as ethylene glycol, propylene glycol, 1,4-butylene glycol, 1,4-cyclohexanedimethanol, diethylene glycol, triethylene glycol, polypropylene glycol, polyoxytetramethylene glycol, an alkylene oxide adduct of a bisphenol compound or a derivative, trimethylolpropane, glycerin or pentaerythritol; polycondensation products of lactic acid, β-hydroxybutyric acid, p-hydroxybenzoic acid, and a hydroxycarboxylic acid such as 2,6-hydroxynaphthoic acid; and the like).

3) Polyamide-based resins (polymers having acid amide bonds in the chain, which are obtainable by polycondensation of a lactam having a 3-membered or higher-membered ring, a polymerizable ω-amino acid, or a dibasic acid and a diamine and the like, and specifically, polymers of ε-caprolactam, aminocaproic acid, enanthlactam, 7-aminoheptanoic acid, 11-aminoundecanoic acid, 9-aminononanoic acid, α-pyrrolidone, α-piperidone, and the like; polymers obtainable by poly-condensing a diamine such as hexamethylenediamine, nonamethylenediamine, undecamethylenediamine, dodecamethylenediamine, or metaxylenediamine, and a dicarboxylic acid such as terephthalic acid, isophthalic acid, adipic acid, sebacic acid, dodecanoic dibasic acid or glutaric acid, or copolymers thereof; and copolymers. Examples include nylon-4, nylon-6, nylon-7, nylon-8, nylon-11, nylon-12, nylon-6,6, nylon-6,10, nylon-6,11, nylon-6,12, nylon-6T, a nylon-6/nylon-6,6 copolymer, a nylon-6/nylon-12 copolymer, a nylon-6/nylon-6T copolymer, and a nylon-6I/nylon-6T copolymer).

4) Rubbers or elastomers (natural rubber, isoprene rubber, butadiene rubber, 1,2-polybutadiene rubber, styrene-butadiene rubber, chloropene rubber, 2-tolyl rubber, butyl rubber, ethylene-propylene rubber, chlorosulfonated polyethylene, acrylic rubber, epichlorohydrin rubber, poly-sulfide rubber, silicone rubber, flourorubber, urethane rubber, and the like).

In addition to those, resins such as a polycarbonate-based resin, an acrylic resin, a urethane-based resin, polyvinyl alcohol, a vinyl chloride-based resin, a styrene-based resin, polyacrylonitrile, polyvinylidene chloride, a fluororesin, polyacetal, polysulfone, ABS, and polyether ether ketone may also be used.

Among the polymers used for the polymer alloying described above, from the viewpoint of not decreasing the biomass degree, polylactic acid, poly-β-hydroxybutyric acid, polybutylene succinate and the like are preferably used.

Polymer alloying is usually carried out by melt kneading, but in the case where phase separation occurs upon simple kneading, a uniform phase can be formed by using a compatibilizer, performing secondary block copolymerization or graft polymerization, or dispersing one of the polymers in a cluster form.

Furthermore, from the viewpoint of achieving polymer alloying without impairing the characteristics exhibited by the polyester polymer of the present invention, the content ratio (on a mass basis) of the polyester polymer of the present invention in a polymer alloy is preferably 20% to 100%, and more preferably 50% to 100%.

Furthermore, as for the polyester polymer of the present invention, desired polymer properties can be achieved by incorporating various fillers. Particularly, incorporation of a filler is effective for improvements of heat resistance, durability and impact resistance.

Regarding the filler, any of an inorganic filler and an organic filler may be used.

Examples of useful inorganic fillers include fibrous inorganic fillers such as glass fiber, carbon fiber, graphite fiber, metal fiber, potassium titanate whisker, aluminum borate whisker, magnesium-based whiskers, silicon-based whiskers, wollastonite, sepiolite, slag fiber, xonotlite, ellestadite, gypsum fiber, silica fiber, silica-alumina fiber, zirconia fiber, boron nitride fiber, silicon nitride fiber, and boron fiber; and plate-shaped or particulate inorganic fillers such as glass flakes, non-swellable mica, fullerene, carbon nanotubes, carbon black, graphite, metal foils, ceramic beads, talc, clay, mica, sericite, zeolite, bentonite, dolomite, kaolin, finely powdered silicic acid, feldspar powder, potassium titanate, Shirasu balloons, calcium carbonate, magnesium carbonate, barium sulfate, calcium oxide, aluminum oxide, titanium oxide, magnesium oxide, aluminum silicate, silicon oxide, aluminum hydroxide, magnesium hydroxide, gypsum, novaculite, dosonite, and white clay.

Furthermore, examples of useful organic fillers include synthetic fibers such as cellulose nanofibers, polyester fibers, nylon fibers, acrylic fibers, regenerated cellulose fibers, acetate fibers, and aramid fiber; natural fibers such as kenaf, ramie, cotton, jute, hemp, sisal, manila hemp, flax, linen, silk, and wool; fibrous organic fillers obtainable from microcrystalline cellulose, sugar cane, wood pulp, waste paper, used paper, and the like; and particulate organic fillers such as organic pigments.

In many cases where the polyester polymer of the present invention is applied as actual products, it is preferable to produce the polyester polymer into a composite material containing at least one additive selected from the group consisting of a flame retardant and a light stabilizer. The flame retardant and light stabilizer included in a composite material containing the polyester polymer of the present invention may be the same flame retardants and light stabilizers described above in connection with the section for resin composition, and the same preferred embodiments are also included.

Furthermore, a material which is used in combination with a flame retardant to enhance flame retardancy, or is used to suppress the spread of fire by forming a carbide coating film on the resin surface (flame retardant aid) is also useful for the composite material containing the polyester polymer of the present invention. Specifically, antimony compounds as aninorganic compounds and organic aromatic compounds (phenol derivatives and the like) are preferably used.

The polyester polymer of the present invention may also be produced into a composite material by incorporating other additives as necessary, in addition to the additives described above. The other additives can be appropriately selected from those conventionally used additives according to the purpose. Examples of the other additives include a plasticizer, a stabilizer, an impact resistance enhancer, a crystal nucleating agent, a lubricating agent, an antistatic agent, a surfactant, a pigment, a dye, a filler, an oxidation inhibitor (hindered phenol-based compounds and phosphorous acid ester-based compounds), a moisture absorption inhibitor, a processing aid, a drip preventing agent, a mold releasing agent (fatty acids, fatty acid metal salts, oxyfatty acids, fatty acid esters, partially saponified aliphatic esters, paraffin, low molecular weight polyolefins, fatty acid amides, alkylenebisfatty acid amides, aliphatic ketones, fatty acid lower alcohol esters, fatty acid polyhydric alcohol esters, fatty acid polyglycol esters, and modified silicones), an antifogging agent, an antibacterial agent, and an antifungal agent. These may be used singly, or two or more kinds may be used in combination.

The composite material of the present invention that is obtainable by incorporating materials described above can be molded (formed) by various methods. Regarding the molding method, for example, extrusion molding and injection molding are used. There are no particular limitations on the applications of the molded products thus obtainable, and examples include components for automobiles, electric appliances, electric and electronic equipment (OA, media-related equipment, optical equipment, and communication equipment), mechanical parts, materials for housing and construction, and various containers such as containers and bottles.

<Molded Product>

The molded product of the present invention contains at least one kind of the polyester polymer, and optionally contains other additives. Regarding the other additives, for example, the additives that are added to the composite material described above may be appropriately incorporated according to the use. Among others, the molded product of the present invention preferably further contains at least one additive selected from the group consisting of a flame retardant and a light stabilizer.

Since the molded product contains the polyester polymer, the molded product exhibits excellent heat resistance, and since the density is low, weight reduction can be achieved.

The shape of the molded product is not particularly limited, and is appropriately selected according to the purpose. Examples thereof include a sheet, a film, a fiber, a casing for electronic instruments, a sensor lens, an LED lamp, a fuse cover, and an IC card.

Also, the molded product may also be configured to include the composite material described above.

<Film>

The film of the present invention has a resin layer which contains at least one kind of the polyester polymer described above and optionally contains other additives. Regarding the other additives, for example, the additives that are added to the composite material described above may be appropriately incorporated according to the use. Among them, the resin layer preferably further contains at least one additive selected from the group consisting of a flame retardant and a light stabilizer.

Since the film contains the polyester polymer in the resin layer, the film exhibits excellent heat resistance and high transparency, and weight reduction can be achieved.

The thickness of the film may be appropriately determined according to the use, for example, the thickness may be adjusted to 4 μm to 1000 μm, and preferably about 25 μm to 500 μm.

The method for producing the film is not particularly limited, and can be appropriately selected from those conventionally used film forming methods according to the purpose. For example, a cast film forming method of dissolving the polyester polymer in an organic solvent and applying the solution may be used.

EXAMPLES

Hereinafter, the present invention will be specifically described by way of Examples, but the present invention is not intended to be limited to these Examples. Furthermore, unless particularly stated otherwise, the units "parts" and "percent (%))" are on a mass basis.

Synthesis Example 1

First, 12-carboxydehydroabietic acid (a-1) that was used in the production of the polyester polymer of the present invention was synthesized according to the synthetic route described below.

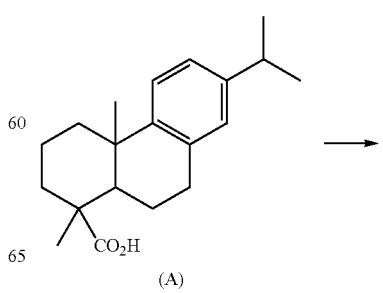

(A)

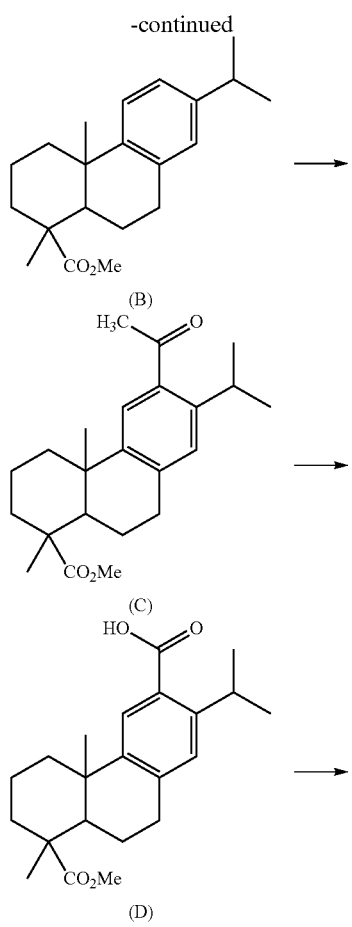

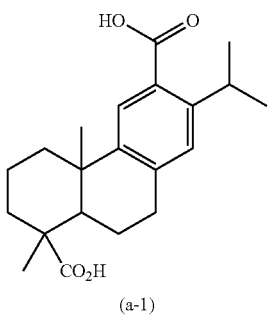

pressure. 100 mL of cold methanol was added to the residue, and white crystals of a compound (C) thus precipitated out were collected by filtration (yield: 65.6 g).

64.0 g of sodium hydroxide was dissolved in 200 mL of water, and 51.2 g of bromine was added dropwise thereto at 8° C. to 10° C. Furthermore, a liquid prepared by dissolving 35.6 g of the compound (C) in 200 mL of dimethoxyethane was added dropwise thereto at 10° C. to 12° C. The mixture was stirred for 2 hours at room temperature, and then the reaction liquid was poured into cold dilute 6 N hydrochloric acid to make the reaction liquid acidic. White crystals thus precipitated out were collected by filtration. The crystals were recrystallized from methanol, and thus 29.8 g of crystals of a compound (D) were obtained.

100 g of a 10% aqueous solution of sodium hydroxide was added to 20.4 g of the compound (D), and the mixture was stirred. Thereafter, the temperature of the reaction system was increased to an externally set temperature of 130° C., and the reaction system was refluxed gently. The reaction system was stirred for 3 hours as it is, and the reaction was checked by thin layer chromatography. Subsequently, the temperature of the reaction system was cooled to room temperature. The content of the reaction system was slowly added to 250 mL of cooled 1 M hydrochloric acid, and thus acid-out was performed. The precipitate was collected by Nutsche filtration, and the filtrate was neutralized by washing the filtrate with running water. A solid was taken therefrom and dried, and thus 19.2 g of 12-carboxydehydroabietic acid (a-1) was obtained.

$^1$H-NMR of 12-carboxydehydroabietic acid (a-1) thus obtained was measured. The $^1$H-NMR chart (solvent: $CDCl_3$) is presented in FIG. 1.

Synthesis Example 2

A dicarboxylic acid (a-2) that was used in the production of the polyester polymer of the present invention was synthesized according to the synthetic route described below.

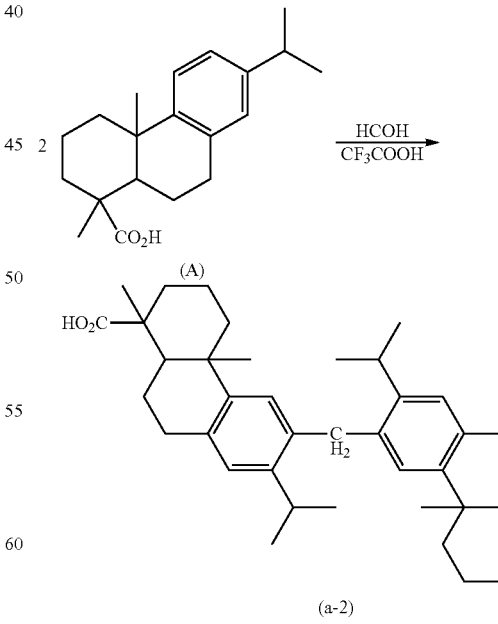

200 mL of trifluoroacetic acid was added dropwise to a mixture of 120 g of 92% dehydroabietic acid (Chemical Formula (A) described above manufactured by Arakawa Chemical Industries, Ltd.), 20 mL of 36% formalin and 200 mL of methylene chloride at 10° to 15° C. The mixture was stirred for 8 hours at 15° C. to 20° C., and subsequently, methylene chloride and trifluoroacetic acid were distilled off under reduced pressure. 2 L of water was added to the residue, and off-white colored crystals were filtered and sufficiently washed with water. After the crystals were dried, 1 L of hot n-hexane was added thereto, and the mixture was stirred for one hour and left to cool. Subsequently, white crystals of (a-2) were collected by filtration. The yield was 118 g.

Example 1

Synthesis of Polyester Polymer (PE-1))

A polyester polymer (PE-1) was synthesized according to the following scheme.

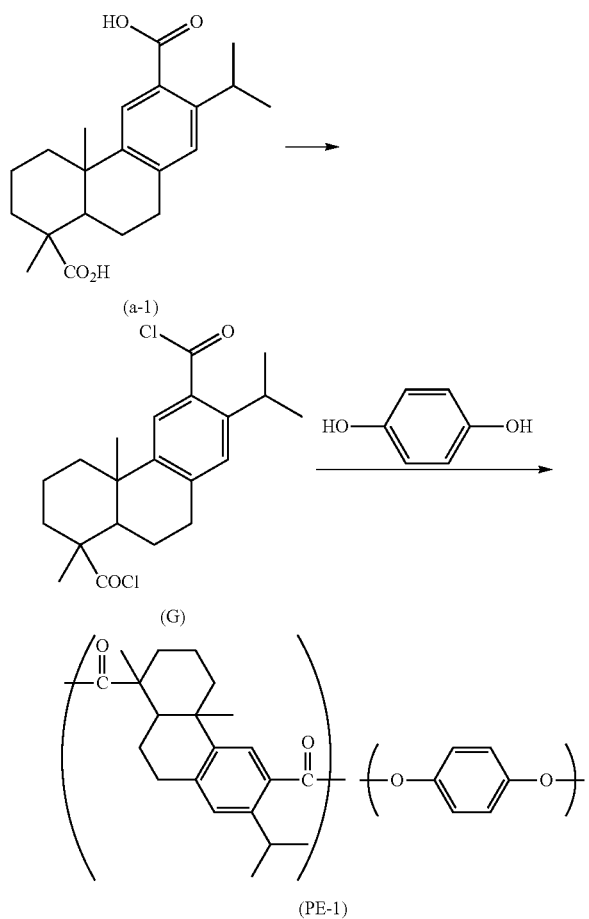

100 g of crystals of the dicarboxylic acid compound (a-1) were dispersed in 300 mL of ethyl acetate, and 52.9 mL of thionyl chloride and 0.1 mL of dimethylformamide were added thereto. The mixture was heated to reflux for 2 hours. During this time period, the crystals were completely dissolved. The solution was left to cool, and then the solvent was distilled off under reduced pressure. 200 mL of ethyl acetate was added to the residue, and needle-shaped crystals thus precipitated out were collected by filtration. The crystals were washed with running hexane, and then were dried under reduced pressure, and thus an acid chloride derivative (G) of the dicarboxylic acid compound (a-1) was obtained. The yield was 60.9 g.

6.06 g of hydroquinone and 14.1 g of N,N'-dimethylaminopyridine were dissolved in 200 mL of N,N'-dimethylacetamide. The temperature inside the system was lowered to 10° C., and 21.0 g of the acid chloride derivative (G) obtained as described above was gradually added in small portions. The reaction liquid gradually became to thicken. The reaction liquid was stirred for 8 hours at room temperature, and then 1 L of methanol was added to the reaction liquid. PE-1 thus produced was separated by filtration, and was washed with methanol. The product thus obtained was dried, and then was heated and dissolved in 200 mL of dimethylformamide. The solution was poured gradually in small portions into 3 L of methanol to cause reprecipitation. The reprecipitate was collected and dried, and then 21.5 g of PE-1 was obtained as a white solid. The weight average molecular weight of the polyester polymer (dehydroabietic acid polymer, PE-1) thus obtained by GPC measurement (solvent: NMP) was 74,000.

Figure 2:
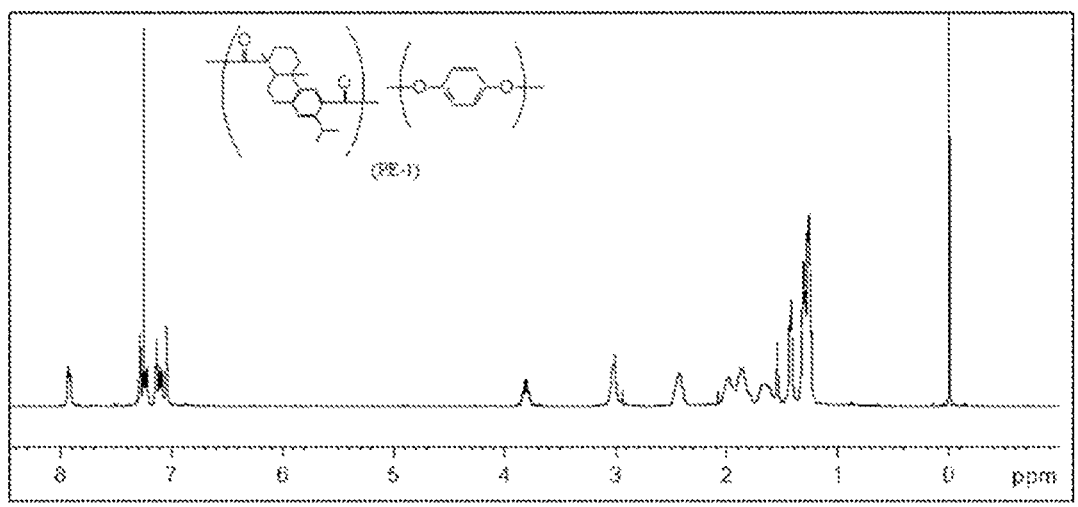
FIG. 2 is a diagram illustrating an example of the $^1$H-NMR spectrum of a polyester polymer according to the present Example.

$^1$H-NMR of PE-1 was measured, and it was confirmed that PE-1 contained a skeletal structure derived from dehydroabietic acid and a structure derived from hydroquinone. The $^1$H-NMR chart of PE-1 (solvent: CDCl$_3$) is presented in FIG. 2.

Examples 2 to 14

Synthesis of Polyester Polymers (PE-2) to (PE-14)

Polyester polymers (PE-2) to (PE-14) were obtained by the same method as that described in Example 1, except that the dicarboxylic acid compound and the diol compound used in Example 1 were respectively changed to the compounds indicated in the following Table 1.

TABLE 1

| | Dicarboxylic acid compound | | Diol compound | | Weight average molecular weight (Mw) | Glass transition temperature |
|---|---|---|---|---|---|---|
| PE-1 | a-1(50) | — | b-1(50) | — | 74000 | 191° C. |
| PE-2 | a-1(50) | — | b-2(50) | — | 54000 | 185° C. |
| PE-3 | a-1(50) | — | b-3(50) | — | 178000 | 227° C. |
| PE-4 | a-1(50) | — | b-3(35) | b-4(15) | 151000 | 230° C. |
| PE-5 | a-1(50) | — | b-2(35) | b-4(15) | 57000 | 192° C. |
| PE-6 | a-2(50) | — | b-3(50) | — | 116000 | 225° C. |
| PE-7 | a-2(50) | — | b-2(50) | — | 102000 | 190° C. |
| PE-8 | a-1(50) | — | b-5(50) | — | 97000 | 189° C. |
| PE-9 | a-1(50) | — | b-6(50) | — | 82000 | 180° C. |
| PE-10 | a-1(50) | — | b-7(50) | — | 77000 | 151° C. |
| PE-11 | a-2(50) | — | b-1(50) | — | 76000 | 190° C. |
| PE-12 | a-1(25) | a-2(25) | b-1(50) | — | 69000 | 192° C. |
| PE-13 | a-1(40) | a-2(10) | b-3(50) | — | 72000 | 218° C. |
| PE-14 | a-1(25) | a-2(25) | b-1(25) | b-3(25) | 80000 | 203° C. |

In Table 1, the numerals inside the parentheses for the dicarboxylic acid compounds and the diol compounds represent the input amount (% by mole) at the time of production of the polyester polymer. Meanwhile, the total amount of the dicarboxylic acid compound and the diol compound was set to 100% by mole. Furthermore, the structures of the dicarboxylic acid compounds and the diol compounds are presented below.

a-1
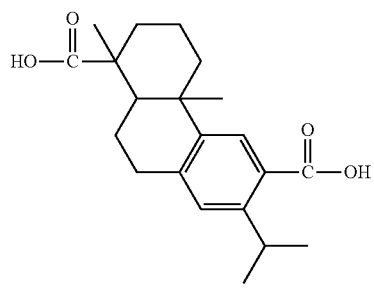

a-2
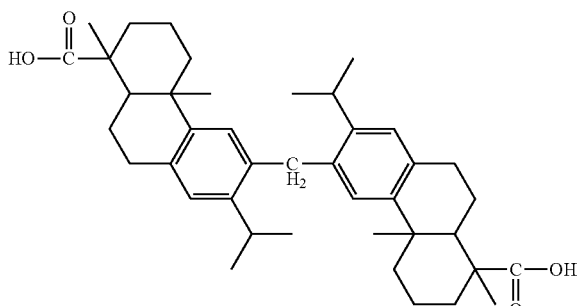

b-1
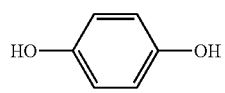

b-2
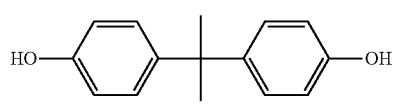

b-3
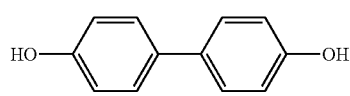

b-4
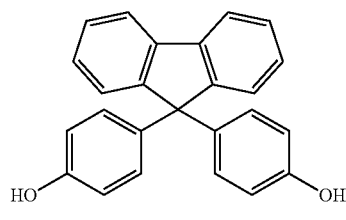

b-5
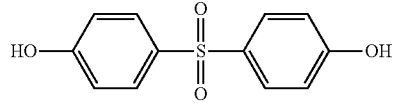

b-6
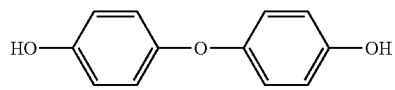

b-7
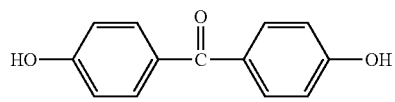

[Evaluation of Glass Transition Temperature (Tg)]

For the polyester polymers thus obtained, the glass transition temperatures (Tg) were measured by using a differential scanning calorimeter (manufactured by SII Nanotechnology, Inc., DSC6200) over a temperature range of 30° C. to 400° C. under the conditions of a rate of temperature increase of 10° C./min under a nitrogen gas stream. The results are presented together in Table 1.

Comparative Example

A rosin-modified phenolic resin (RE-1) which used, as raw materials, purified rosin and a resole-type phenolic resin obtained by using a volatile basic catalyst, was obtained according to Example 1 of JP-A No. 2008-274150.

The glass transition temperature of the rosin-modified phenolic resin thus obtained was measured, and the glass transition temperature was lower than 150° C., while sufficient heat resistance was not obtained.

From the results described above, the polyester polymers of the present invention all had a glass transition temperature of 150° C. or higher, and exhibited excellent heat resistance. This implies that the materials obtainable from these polymers will have high heat resistance.

<Film Production>

The polyester polymer PE-1 obtained as described above was dissolved in methylene chloride at a concentration of 10%, and this solution was filtered under pressure through a filter paper (manufactured by Toyo Roshi Kaisha, Ltd., #63) having an absolute filtration accuracy of 0.01 mm to prepare a dope. The dope thus prepared was flow cast on a glass substrate by using a doctor blade. After the flow casting, the glass substrate was left to stand for 6 hours at room temperature, and then was heated and dried for 30 minutes at 40° C. and for 30 minutes at 100° C. Thereafter, the dope was subjected to vacuum drying for one hour at 140° C. and 1 Torr, and thus a film FE-1 containing the polyester polymer was produced.

Films FE-2, FE-3, FE-4, FE-5, FE-6, and FE-7 were produced in the same manner by using the polyester polymers PE-2, PE-3, PE-4, PE-5, PE-6, and PE-7.

[Evaluation of Film]

In regard to the films obtained as described above, the glass transition temperature, water absorption rate, density, elastic modulus, breaking strength, total light transmittance, film thickness, and biomass degree were respectively evaluated by the following evaluation methods. The evaluation results are presented in Table 2.

In addition, an evaluation was carried out using a U-POLYMER (U100 manufactured by Unitika, Ltd.) represented by the following chemical formula as a comparative film of the polyester polymer. Meanwhile, in the chemical formula described below, n represents the number of repetition.

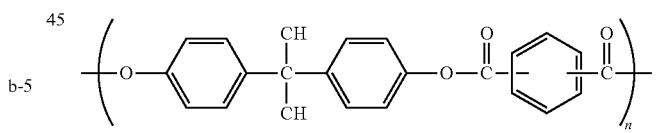

(Glass Transition Point Temperature (Tg))

A strip-shaped test specimen having a size of 5 mm×22 mm was cut out from each of the films thus obtained, this was submitted to a dynamic viscoelasticity analyzer, RHEOGEL-E4000 (manufactured by UBM Co., Ltd.), and the tangent loss (tan δ) in a temperature range of 25° C. to 350° C. was measured in a tensile mode. The temperature at which the tangent loss (tan δ) exhibited the maximum value was designated as the glass transition temperature (Tg).

(Water Absorption Ratio)

Each of the films thus obtained was immersed in water at 23° C. for 24 hours, subsequently water droplets on the surface were thoroughly wiped, and the mass was quickly measured. The water absorption ratio was calculated by the following formula.

Water absorption ratio (%)=(Mass of film after immersion in water−mass of film before immersion in water)/mass of film before immersion of water (Density)

For each of the films thus obtained, the density was measured by using a precision density meter, AUW120D (manufactured by Shimadzu Corp.).

(Elastic Modulus and Breaking Strength of Film)

A strip-shaped test specimen having a size of 10 mm×50 mm was cut out from each of the films thus obtained, and this was used as a test specimen. The test specimen was humidified for 2 hours or longer at 25° C. and 60% RH, subsequently a tensile test was carried out using a TENSILON universal testing machine (manufactured by Orientec Co.) under the conditions of a distance between chucks of 30 mm, a temperature of 25° C., and a tensile rate of 3 mm/min, and thus the elastic modulus and the breaking strength were determined Measurement was carried out with three samples, and the arithmetic average value thereof was determined.

(Total Light Transmittance)

The total light transmittance of each of the films thus obtained was measured by using a haze meter (Model 1001 DP, manufactured by Nippon Denshoku Industries Co., Ltd.). Measurement was made at three sites, and the arithmetic mean of the values was determined.

(Film Thickness)

The film thickness of each of the films thus obtained was measured with a digital linear gauge, DG-525H (manufactured by Ono Sokki Co. Ltd.). Measurement was made at three sites, and the arithmetic mean of the values was determined.

(Biomass Degree)

The biomass degree was calculated according to the following formula.

Biomass degree (%)=(Mass originating from plants in the constituent components of the polymer)/(total mass of the constituent components of the polymer)

6 hours at room temperature, and was subsequently heated to dry for 30 minutes at 40° C. and then for 30 minutes at 100° C. Thereafter, the dope was vacuum dried at 140° C. and 1 Torr for one hour, and thus a film FE-8 containing a polyester polymer and additives was obtained.

Films FE-9 to FE-12 each containing the polyester polymer and additives were produced in the same manner as in the production of FE-8, except that the kinds and composition ratios of the polyester polymer and the additives as indicated in Table 3.

Meanwhile, the abbreviations in Table 3 are as follows. TPP, PX-200, and PX-202 are flame retardants; TINUVIN 328, TINUVIN 1577, CHIMASSORB 944, and TINUVIN 622 are light stabilizers; and IRGANOX 1010 and ADEKA STAB PEP36 are oxidation inhibitors. They respectively have the following structures.

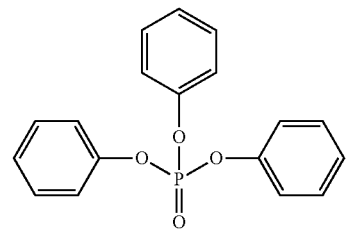

TPP

TABLE 2

|  | Glass transition temperature (° C.) | Water absorption ratio (mass %) | Density (g/cm³) | Elastic modulus (GPa) | Breaking strength (MPa) | Total light transmittance (%) | Film thickness (μm) | Biomass degree (%) |
| --- | --- | --- | --- | --- | --- | --- | --- | --- |
| FE-1 | 278 | 0.22 | 1.13 | 1.7 | 78 | 89.8 | 100 | 67 |
| FE-2 | 272 | 0.27 | 1.11 | 1.9 | 65 | 90.4 | 100 | 52 |
| FE-3 | 298 | 0.23 | 1.14 | 2 | 84 | 89.7 | 100 | 57 |
| FE-4 | 304 | 0.32 | 1.13 | 1.9 | 74 | 89 | 100 | 49 |
| FE-5 | 289 | 0.15 | 1.11 | 1.7 | 68 | 89.6 | 100 | 47 |
| FE-6 | 287 | 0.39 | 1.07 | 1.8 | 63 | 90.3 | 100 | 75 |
| FE-7 | 265 | 0.19 | 1.04 | 1.8 | 44 | 90.6 | 100 | 71 |
| U-POLYMER (U100) | 223 | 0.55 | 1.21 | 1.9 | 78 | 89.5 | 100 | 0 |

From Table 2, it is understood that the films of the present invention have high biomass degrees. Furthermore, it is understood that the films have high glass transition temperatures and excellent heat resistance. It is also understood that the films have low densities.

<Production of Additive-Containing Films>

The polyester polymer PE-1 (79.5 parts) described above, PX-200 (20 parts, flame retardant), IRGANOX 1010 (0.4 parts, oxidation inhibitor), and ADEKA STAB PEP36 (0.1 parts, oxidation inhibitor) were dissolved in methylene chloride at a concentration of 10%, this solution was filtered under pressure through a filter paper (manufactured by Toyo Roshi Co., Ltd., #63) having an absolute filtration accuracy of 0.01 mm, and thus a dope was prepared. Subsequently, the dope thus prepared was flow cast on a glass substrate by using a doctor blade. After flow casting, the dope was left to stand for -continued

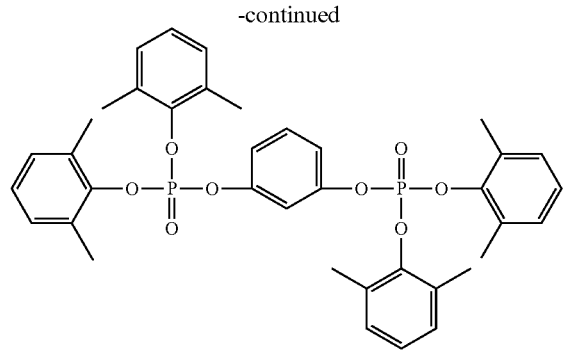

PX-200

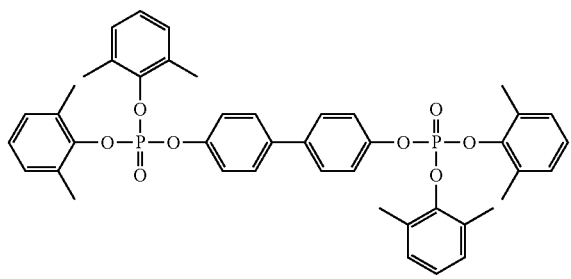

PX-202

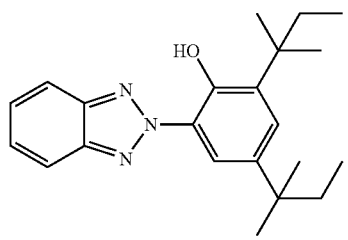

Tinuvin 328

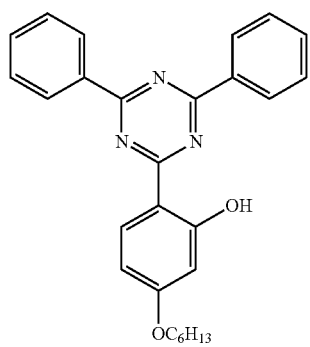

Tinuvin 1577

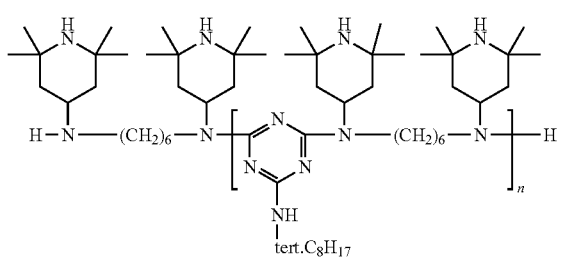

CHIMASSORB 944

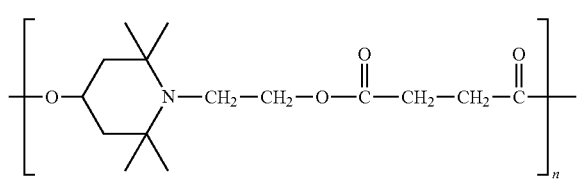

Tinuvin 622

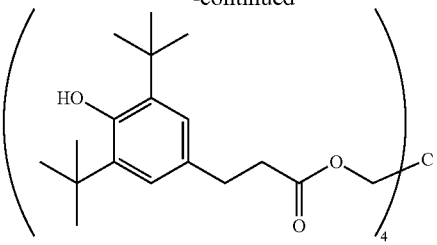

Irganox1010

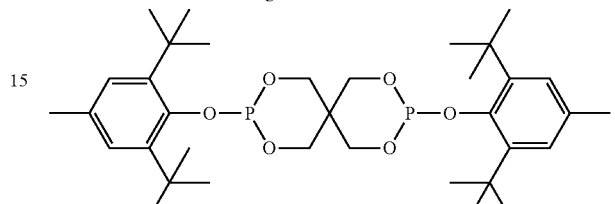

ADEKA STAB PEP36

[Evaluation of Additive-Containing Film]

For the films FE-8 to FE-12 obtained as described above, flame retardancy, light stability, and film thickness were evaluated by the following test methods. Furthermore, as comparative controls, the films FE-1 and FE-2 described above were also subjected to the same evaluation. The evaluation results are presented in Table 3.

(Flame Retardancy)

A thin material vertical burning test was carried out according to ASTM D4804. That is, a film test specimen ((200±5)× (50±1)×t[mm]) was rolled into a cylindrical shape and vertically set on a clamp, and the film test specimen was brought into contact with a 20-mm flame for 3 seconds twice. Thus, VTM-0, VTM-1, VTM-2, and Not were judged on the basis of their burning behavior.

(Light Stability)

A test specimen (10 mm×50 mm) cut from a film was irradiated with a xenon lamp for 1000 hours at room temperature, and the breaking strength retention ratios before and after the irradiation were calculated. The breaking strength was measured by humidifying the test specimen at 25° C. and 60% RH for 2 hours or longer, and then performing a tensile test using a TENSILON universal test machine (manufactured by Orientec Co.) under the conditions of a distance between chucks of 30 mm, a temperature of 25° C., and a tensile rate of 3 mm/min. Measurement was made with three specimens for each film, and the arithmetic mean of the breaking strength thus measured was determined. Also, the breaking strength retention ratio was calculated by the following formula.

Breaking strength retention ratio (%)=(Breaking strength after irradiation with xenon lamp)/ (breaking strength before irradiation with xenon lamp)

Furthermore, coloration occurring after irradiation of a xenon lamp for 1000 hours was evaluated by visual inspection.

(Film Thickness)

The film thickness of each of the films was measured with a digital linear gauge, DG-525H (manufactured by Ono Sokki Co., Ltd.). Measurement was made at three sites, and the arithmetic mean of the values was determined.

TABLE 3

|  |  | FE-1 | FE-8 | FE-9 | FE-10 | FE-2 | FE-11 | FE-12 |
|---|---|---|---|---|---|---|---|---|
| Polyester polymer | PE-1 | 100 parts | 79.5 parts | 84.5 parts | 98.5 parts | — | — | — |
|  | PE-2 | — | — | — | — | 100 parts | 79.5 parts | 98.5 parts |
| Flame retardant | TPP | — | — | 15 parts | — | — | — | — |
|  | PX-200 | — | 20 parts | — | — | — | — | — |
|  | PX-202 | — | — | — | — | — | 20 parts | — |
| Light stabilizer | Tinuvin 328 | — | — | — | 0.5 parts | — | — | — |
|  | Tinuvin 1577 | — | — | — | — | — | — | 0.5 parts |
|  | CHIMASSORB 944 | — | — | — | 0.5 parts | — | — | — |
|  | Tinuvin 622 | — | — | — | — | — | — | 0.5 parts |
| Oxidation inhibitor | Irgnox 1010 | — | 0.4 parts | 0.4 parts | 0.4 parts | — | 0.4 parts | 0.4 parts |
|  | ADEKA STAB PEP36 | — | 0.1 parts | 0.1 parts | 0.1 parts | — | 0.1 parts | 0.1 parts |
| Flame retardancy (VTM) |  | Not | 2 | 2 | Not | Not | 2 | Not |
| Light stability (breaking strength retention ratio) [%] |  | 60 | 68 | 70 | 88 | 61 | 66 | 87 |
| Light stability (coloration) |  | Present | Present | Present | Absent | Present | Present | Absent |
| Film thickness [μm] |  | 50 | 50 | 50 | 50 | 50 | 50 | 50 |

As can be seen from Table 3, the polyester polymer of the present invention has enhanced flame retardancy as a flame retardant is added thereto. Furthermore, in the polyester polymer of the present invention, when a light stabilizer is added thereto, a decrease in the breaking strength caused by light irradiation is suppressed, and coloration is also suppressed. Therefore, the polyester polymer of the present invention can have the properties adjusted when additives are added to the polyester polymer.

All publications, patent applications, and technical standards mentioned in this specification are herein incorporated by reference to the same extent as if each individual publication, patent application, or technical standard was specifically and individually indicated to be incorporated by reference.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplate. It is intended that the scope of the invention be defined by the following claims and their equivalents.

The invention claimed is:

1. A polyester polymer comprising:
    a repeating unit derived from a dicarboxylic acid compound containing; and
    a repeating unit derived from a diol compound containing a cyclic structure,
    wherein,
        the repeating unit derived from the dicarboxylic acid compound is at least one selected from the group consisting of a repeating unit represented by the following Formula (A1) and a repeating unit represented by the following Formula (A2):

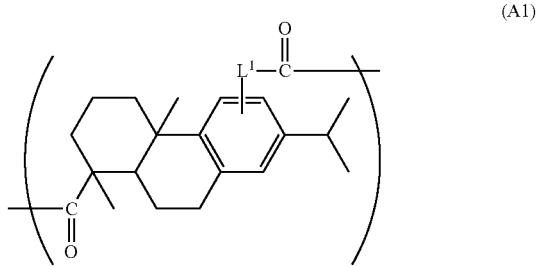

(A1)

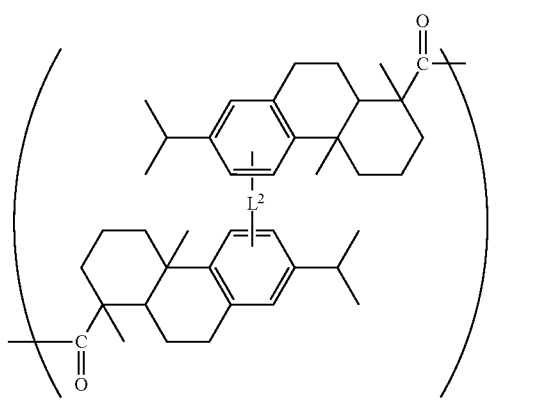

(A2)

wherein, in Formulae (A1) and (A2), $L^1$ represents a single bond or a divalent linking group composed of at least one selected from the group consisting of an alkylene group, an alkenylene group, an arylene group, an oxygen atom and a carbonyl group; and $L^2$ represents a single bond or a divalent linking group composed of at least one selected from the group consisting of an oxygen atom, a sulfur atom, a carbonyl group, a sulfonyl group, an alkylene group, an alkenylene group and an arylene group.

2. The polyester polymer according to claim 1, wherein $L^1$ represents a single bond or at least one selected from the group consisting of linking groups represented by the following Formulae (L1-ex-1) to (L1-ex-17):

*——CH$_2$——** (L1-ex-1)

51
-continued

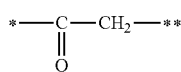 (L1-ex-2)

 (L1-ex-3)

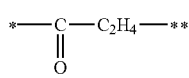 (L1-ex-4)

 (L1-ex-5)

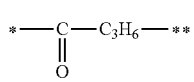 (L1-ex-6)

 (L1-ex-7)

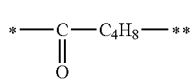 (L1-ex-8)

 (L1-ex-9)

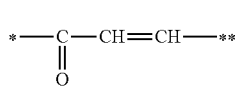 (L1-ex-10)

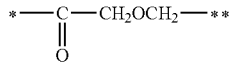 (L1-ex-11)

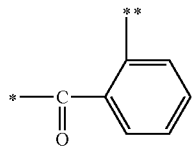 (L1-ex-12)

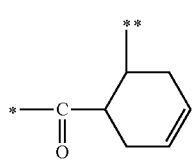 (L1-ex-13)

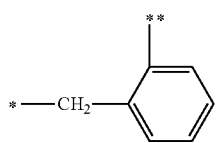 (L1-ex-14)

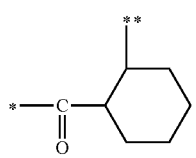 (L1-ex-15)

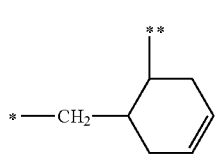 (L1-ex-16)

52
-continued

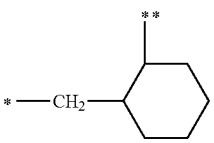 (L1-ex-17)

wherein, in Formulae (L1-ex-1) to (L1-ex-17), * represents a position of bonding to a dehydroabietic acid-based skeletal structure; and ** represents a position of bonding to a carbonyl group.

3. The polyester polymer according to claim 1, wherein $L^2$ represents a single bond or at least one selected from the group consisting of linking groups represented by the following Formulae (L2-ex-1) to (L2-ex-16):

—O— (L2-ex-1)

—CH$_2$— (L2-ex-2)

—S— (L2-ex-3)

$$-\underset{\underset{O}{\|}}{C}-$$ (L2-ex-4)

—SO$_2$— (L2-ex-5)

—CH=CH— (L2-ex-6)

—CH$_2$CH$_2$— (L2-ex-7)

—SCH$_2$CH$_2$S— (L2-ex-8)

(L2-ex-9)
[structure: —CH$_2$—C$_6$H$_2$(OH)(CH$_3$)—CH$_2$—]

(L2-ex-10)
[structure: —CH$_2$—C$_6$H$_2$(OH)(OCH$_3$)—CH$_2$—]

(L2-ex-11)
[structure: —CH$_2$—C$_6$H$_2$(OH)(C$_4$H$_9$(i))—CH$_2$—]

(L2-ex-12)
[structure: 1,5-naphthylene-bis(methylene)]

-continued

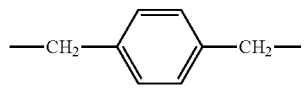
(L2-ex-13)

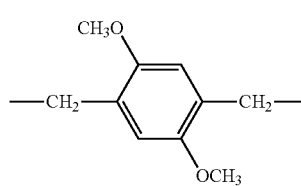
(L2-ex-14)

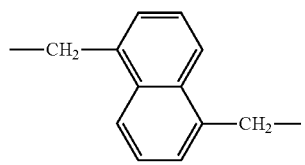
(L2-ex-15)

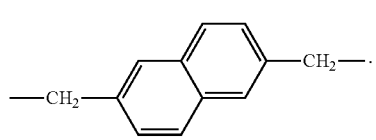
(L2-ex-16)

4. The polyester polymer according to claim 1, wherein Formula (A1) is represented by the following Formula (A1-ex-1):

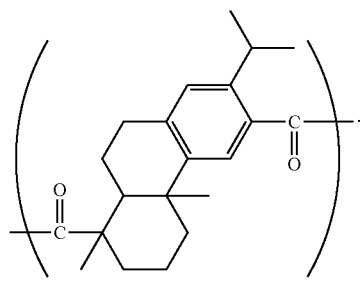
(A1-ex-1)

5. The polyester polymer according to claim 1, wherein Formula (A2) is represented by the following Formula (A2-ex-1):

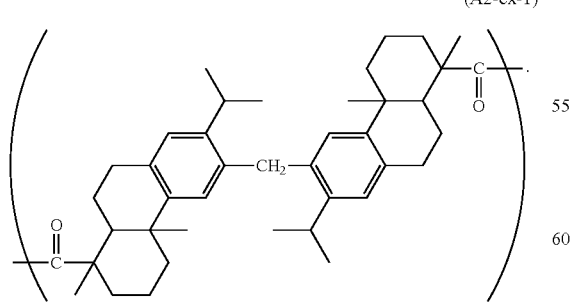
(A2-ex-1)

6. The polyester polymer according to claim 1, wherein the repeating unit derived from the diol compound contains an aromatic ring group.

7. The polyester polymer according to claim 1, wherein the repeating unit derived from the diol compound is a repeating unit represented by the following Formula (B2):

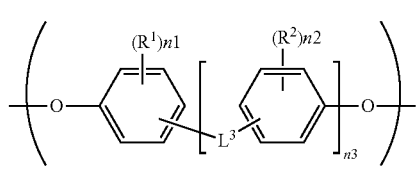
(B2)

wherein in Formula (B2), $L^3$ represents a single bond or a divalent linking group composed of at least one selected from the group consisting of an oxygen atom, a carbonyl group, a sulfonyl group and an alkylene group; when there is more than one $L^3$, each $L^3$ may be identical or different from each other $L^3$; $R^1$ and $R^2$ each independently represent a substituent selected from the group consisting of a halogen atom, an alkyl group and an alkoxy group, wherein $R^1$ and $R^2$ may be bonded to each other to form a ring; when there is more than one $R^1$ or more than one $R^2$, the each $R^1$ or $R^2$ may be identical or different from each other $R^1$ or $R^2$; n1 and n2 each independently represent an integer from 0 to 4; and n3 represents an integer from 0 to 2.

8. The polyester polymer according to claim 7, wherein the repeating unit represented by Formula (B2) is at least one selected from the group consisting of repeating units represented by the following Formulae (B2-ex-1) to (B2-ex-16):

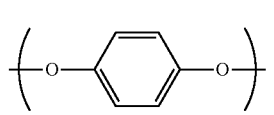
(B2-ex-1)

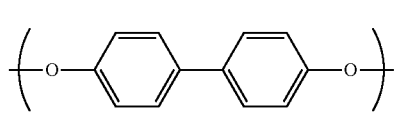
(B2-ex-2)

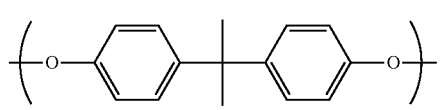
(B2-ex-3)

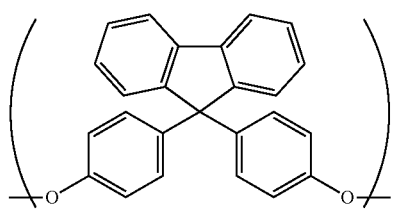
(B2-ex-4)

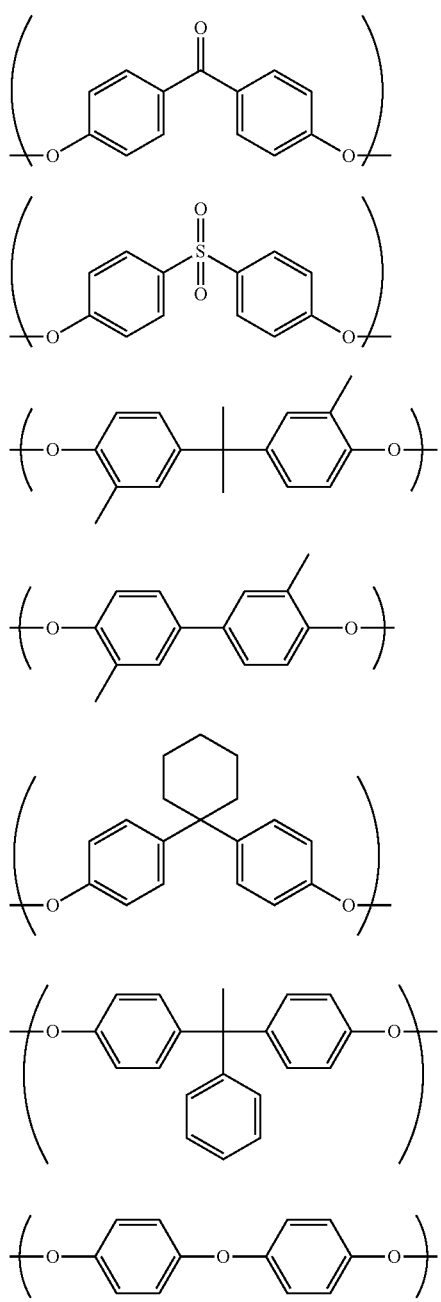
(B2-ex-5)
(B2-ex-6)
(B2-ex-7)
(B2-ex-8)
(B2-ex-9)
(B2-ex-10)
(B2-ex-11)
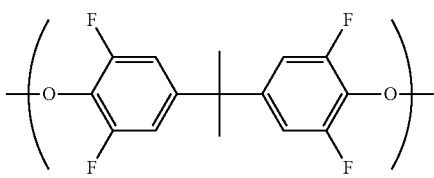
(B2-ex-12)
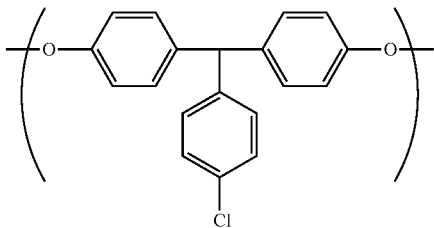
(B2-ex-13)
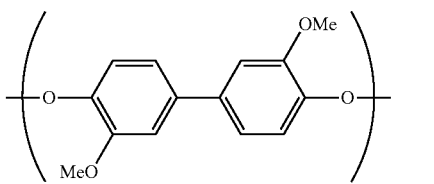
(B2-ex-14)
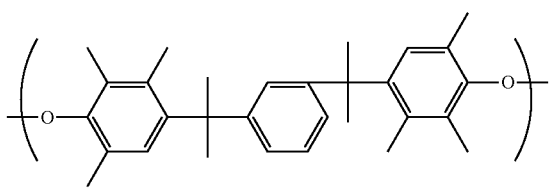
(B2-ex-15)
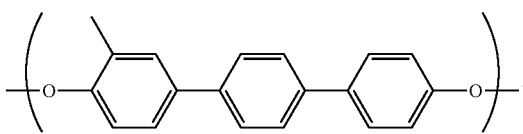
(B2-ex-16)
9. A molded product, comprising the polyester polymer according to claim 1.
10. A film, having a resin layer comprising the polyester polymer according to claim 1.
* * * * *